US012581295B2

(12) United States Patent
Gundavelli et al.

(10) Patent No.: US 12,581,295 B2
(45) Date of Patent: Mar. 17, 2026

(54) TECHNIQUES TO GENERATE WIRELESS LOCAL AREA ACCESS NETWORK FAST TRANSITION KEY MATERIAL BASED ON AUTHENTICATION TO A PRIVATE WIRELESS WIDE AREA ACCESS NETWORK

(71) Applicant: Cisco Technology, Inc., San Jose, CA (US)

(72) Inventors: Srinath Gundavelli, San Jose, CA (US); Indermeet Singh Gandhi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/453,575

(22) Filed: Aug. 22, 2023

(65) Prior Publication Data

US 2024/0031807 A1     Jan. 25, 2024

Related U.S. Application Data

(63) Continuation of application No. 17/069,047, filed on Oct. 13, 2020, now Pat. No. 11,778,463.

(Continued)

(51) Int. Cl.
*H04L 29/00* (2006.01)
*H04W 8/24* (2009.01)
(Continued)

(52) U.S. Cl.
CPC ............. *H04W 12/06* (2013.01); *H04W 8/24* (2013.01); *H04W 12/0471* (2021.01); *H04W 84/12* (2013.01)

(58) Field of Classification Search
CPC ... H04W 12/06; H04W 12/0471; H04W 8/24; H04W 84/12

(Continued)

(56) References Cited

U.S. PATENT DOCUMENTS 7,788,492 B2     8/2010   Cam Winget
7,873,352 B2     1/2011   Nguyen et al.
(Continued)

FOREIGN PATENT DOCUMENTS

CA          2546543 A1     11/2006
EP          1672945 A1      6/2006
(Continued)

OTHER PUBLICATIONS

Gures E., et al., "A Comprehensive Survey on Mobility Management in 5G Heterogeneous Networks: Architectures, Challenges and Solutions," IEEE Access, https://ieeexplore.ieee.org/stamp/stamp.jsp?arnumber=9222019, Nov. 9, 2020, vol. 8, 31 pages.
(Continued)

*Primary Examiner* — Jeffrey C Pwu
*Assistant Examiner* — Michael D Anderson
(74) *Attorney, Agent, or Firm* — Edell, Shapiro & Finnan, LLC

(57) ABSTRACT

Presented herein are techniques to provide for the ability to utilize 3GPP-generated Session Keys that can be generated via a primary authentication or a secondary authentication process for a user equipment (UE) via a private wireless wide area (WWA) access network in which the keys can be leveraged to facilitate connection of the UE to a wireless local area (WLA) access network. In one example, a method may include obtaining a request to authenticate a UE for connection to a WWA access network; determining that the UE is capable of a Fast Transition (FT) capability; authenticating the UE for connection to the WWA access in which, based on the FT capability, the authenticating includes generating a root security key for the UE; and upon determining that the UE is attempting to access the WLA access network, providing the root security key for the UE to the WLA access network.

27 Claims, 14 Drawing Sheets

Related U.S. Application Data

(60) Provisional application No. 63/002,516, filed on Mar. 31, 2020.

(51) Int. Cl.
| | |
|---|---|
| *H04W 12/0471* | (2021.01) |
| *H04W 12/06* | (2021.01) |
| *H04W 84/12* | (2009.01) |

(58) Field of Classification Search
USPC .......................................................... 726/2
See application file for complete search history.

(56) References Cited

U.S. PATENT DOCUMENTS

| | | | |
|---|---|---|---|
| 8,023,484 | B1 | 9/2011 | Huang et al. |
| 8,036,222 | B1 | 10/2011 | Huang et al. |
| 8,559,392 | B2 | 10/2013 | Ramankutty et al. |
| 8,725,138 | B2 | 5/2014 | Lee et al. |
| 8,959,598 | B2 | 2/2015 | Smith |
| 9,264,900 | B2 | 2/2016 | Sun et al. |
| 9,692,744 | B2 | 6/2017 | Bent et al. |
| 9,699,601 | B2 | 7/2017 | Grayson et al. |
| 9,820,199 | B2 | 11/2017 | Mccann et al. |
| 9,826,401 | B2 | 11/2017 | Carames et al. |
| 10,015,713 | B2 | 7/2018 | Hedberg et al. |
| 10,039,151 | B1 | 7/2018 | Upp et al. |
| 10,080,097 | B2 | 9/2018 | Grayson et al. |
| 10,165,608 | B2 | 12/2018 | Grayson et al. |
| 10,257,753 | B2 | 4/2019 | Sirotkin et al. |
| 10,432,463 | B2 * | 10/2019 | Likar ................. H04L 41/0889 |
| 10,750,350 | B1 | 8/2020 | Gundavelli et al. |
| 10,750,366 | B1 | 8/2020 | Gundavelli et al. |
| 10,785,652 | B1 | 9/2020 | Ravindranath et al. |
| 10,984,128 | B1 | 4/2021 | Hoffer |
| 11,070,974 | B2 | 7/2021 | Dodd-Noble et al. |
| 11,108,773 | B1 | 8/2021 | Dhani Reddy |
| 2002/0193100 | A1 | 12/2002 | Riffe et al. |
| 2003/0069030 | A1 | 4/2003 | Mukherjee |
| 2004/0242228 | A1 | 12/2004 | Lee et al. |
| 2006/0256763 | A1 | 11/2006 | Nguyen et al. |
| 2007/0064647 | A1 | 3/2007 | Prasad |
| 2007/0110009 | A1 | 5/2007 | Bachmann et al. |
| 2007/0206537 | A1 | 9/2007 | Cam-Winget et al. |
| 2010/0002626 | A1 | 1/2010 | Schmidt et al. |
| 2010/0035578 | A1 | 2/2010 | Ahmed |
| 2010/0199332 | A1 | 8/2010 | Bachmann et al. |
| 2011/0075675 | A1 | 3/2011 | Koodli et al. |
| 2013/0176897 | A1 | 7/2013 | Wang et al. |
| 2013/0305332 | A1 | 11/2013 | Narasimhan et al. |
| 2013/0336210 | A1 | 12/2013 | Connor et al. |
| 2014/0050320 | A1 | 2/2014 | Choyi et al. |
| 2014/0328193 | A1 | 11/2014 | Horn et al. |
| 2016/0066234 | A1 | 3/2016 | Cho et al. |
| 2016/0094988 | A1 | 3/2016 | Lee et al. |
| 2016/0112869 | A1 | 4/2016 | Lee et al. |
| 2016/0127897 | A1 | 5/2016 | Lee et al. |
| 2016/0127903 | A1 | 5/2016 | Lee et al. |
| 2016/0373992 | A1 | 12/2016 | Jung et al. |
| 2017/0078874 | A1 | 3/2017 | Lee et al. |
| 2017/0134940 | A1 | 5/2017 | Sharma et al. |
| 2017/0223531 | A1 | 8/2017 | Mestanov et al. |
| 2017/0230826 | A1 | 8/2017 | Mestanov et al. |
| 2017/0332273 | A1 | 11/2017 | Link, II |
| 2018/0020383 | A1 | 1/2018 | Sirotkin et al. |
| 2018/0041930 | A1 | 2/2018 | Hampel et al. |
| 2018/0145982 | A1 | 5/2018 | Wang et al. |
| 2018/0184297 | A1 | 6/2018 | Mohamed et al. |
| 2018/0184345 | A1 | 6/2018 | Likar et al. |
| 2018/0206117 | A1 | 7/2018 | Stahl |
| 2018/0262978 | A1 | 9/2018 | Kahn et al. |
| 2018/0332442 | A1 | 11/2018 | Shaw et al. |
| 2018/0352490 | A1 | 12/2018 | Hu et al. |
| 2019/0007376 | A1 | 1/2019 | Norrman et al. |
| 2019/0037390 | A1 | 1/2019 | Hooda et al. |
| 2019/0037613 | A1 | 1/2019 | Anantharaman et al. |
| 2019/0053049 | A1 * | 2/2019 | Kunz .................. H04L 63/0428 |
| 2019/0115950 | A1 * | 4/2019 | Kakinada .............. H04W 76/15 |
| 2019/0230510 | A1 | 7/2019 | Ben Henda et al. |
| 2019/0253407 | A1 | 8/2019 | Livanos et al. |
| 2019/0268759 | A1 | 8/2019 | Targali |
| 2019/0313318 | A1 | 10/2019 | Pawar et al. |
| 2020/0153871 | A1 | 5/2020 | Lei et al. |
| 2020/0162889 | A1 | 5/2020 | Desai et al. |
| 2020/0204984 | A1 | 6/2020 | Dodd-Noble et al. |
| 2021/0084493 | A1 | 3/2021 | Naribole et al. |
| 2021/0105632 | A1 | 4/2021 | Pazhyannur et al. |
| 2021/0124850 | A1 | 4/2021 | Messervy et al. |
| 2021/0185506 | A1 | 6/2021 | Gundavelli et al. |
| 2021/0195399 | A1 | 6/2021 | Li et al. |
| 2021/0204179 | A1 * | 7/2021 | Mustajarvi ........ H04W 36/1446 |
| 2021/0218744 | A1 | 7/2021 | Gandhi et al. |
| 2021/0281445 | A1 | 9/2021 | Trim et al. |
| 2021/0385742 | A1 | 12/2021 | Liao |
| 2022/0330008 | A1 | 10/2022 | Balasubramanian |
| 2023/0164683 | A1 | 5/2023 | Wong et al. |

FOREIGN PATENT DOCUMENTS

| | | | |
|---|---|---|---|
| EP | 3494727 | B1 | 5/2020 |
| WO | 2009008627 | A2 | 1/2009 |
| WO | 2018026551 | A1 | 2/2018 |
| WO | 2018052409 | A1 | 3/2018 |

OTHER PUBLICATIONS

3GPP: "3rd Generation Partnership Project; Technical Specification Group Core Network and Terminals; 5G System; Session Management Services; Stage 3 (Release 16)," 3GPP TS 29.502 V16.4.0, Jul. 2020, pp. 1-256.

3GPP: "3rd Generation Partnership Project, Technical Specification Group Core Network and Terminals, Access Network Discovery and Selection Function (ANDSF) Management Object (MO) (Release 16)", 3GPP TS 24.312, V16.0.0, Jul. 2020, pp. 1-394.

3GPP: "3rd Generation Partnership Project; Technical Specification Group Core Network and Terminals; Non-Access Stratum (NAS) protocol for Evolved Packet System (EPS); Stage 3 (Release 16)," 3GPP TS 24.301 V16.1.1, Jun. 2019, 549 Pages.

3GPP, "3rd Generation Partnership Project; Technical Specification Group Radio Access Network; Evolved Universal Terrestrial Radio Access (E-UTRA); User Equipment (UE) procedures in idle mode (Release 16)," TS 36.304, V16.1.0, Jul. 2020, pp. 1-63 pages.

3GPP: "3rd Generation Partnership Project; Technical Specification Group Services and System Aspects; Procedures for the 5G System (5GS); Stage 2 (Release 16)," 3GPP TS 23.502 V16.5.0, Jul. 2020, pp. 1-594.

3GPP: "3rd Generation Partnership Project; Technical Specification Group Services and System Aspects; Security architecture and procedures for 5G system (Release 16)," 3GPP Standard, Technical Specification, 3GPP TS 33.501, 3rd Generation Partnership Project (3GPP), Mobile Competence Centre, 650, Route Des Lucioles, F-06921 Sophia-Antipolis Cedex, France, Mar. 27, 2020, vol. SA WG3, No. V16.2.0, 227 pages, XP051861202, Retrieved from URL: http://ftp.3gpp.org/Specs/archive/33_series/33.501/33501-g20. zip.

3GPP: "3rd Generation Partnership Project; Technical Specification Group Services and System Aspects; Security Architecture and Procedures for 5G System (Release 16)," 3GPP TS 33.501 V16.4.0, Sep. 2020, pp. 1-250.

Aboba B., et al., "Extensible Authentication Protocol (EAP) Key Management Framework," Network Working Group, Request for Comments: 5247, Updates: 3748, Category: Standards Track, Aug. 2008, pp. 1-79.

Aboba B., et al., "Extensible Authentication Protocol (EAP)," Network Working Group, Request for Comments: 3748, Obsoletes: 2284, Category: Standards Track, Jun. 2004, pp. 1-67.

Arkko J., et al., "Extensible Authentication Protocol Method for 3rd Generation Authentication and Key Agreement (EAP-AKA)," Net-

(56)        References Cited

OTHER PUBLICATIONS work Working Group, Request for Comments: 4187, Category: Informational, Jan. 2006, pp. 1-79.

Arkko J., et al., "Improved Extensible Authentication Protocol Method for 3rd Generation Authentication and Key Agreement (EAP-AKA)," Network Working Group, Request for Comments: 5448, Updates: 4187, Category: Informational, May 2009, 29 Pages.

Cablelabs: "A Comparative Introduction to 4G and 5G Authentication," Feb. 2019, 19 Pages, Retrieved from URL: https://www.cablelabs.com/insights/a-comparative-introduction-to-4g-and-5g-authentication.

Cisco: "802.11r Fast Transition Roaming," 802.11r, 802.11k and 802.11w Deployment Guide, Cisco IOS-XE Release 3.3, Jul. 2015, 08 pages.

Elsadek W. F., et al., "Inter-domain Mobility Management Using SDN for Residential/enterprise Real Time Services", 2016 IEEE 4th International Conference on Future Internet of Things and Cloud Workshops FiCioudW, Vienna, Austria, 2016, pp. 43-50.

Eronen P., et al., "Diameter Extensible Authentication Protocol (EAP) Application," Network Working Group, Request for Comments: 4072, Category: Standards Track, Aug. 2005, pp. 1-33.

ETSI: "5G; Security Architecture and Procedures for 5G System (3GPP TS 33.501 Version 15.1.0 Release 15)," ETSI TS 133 501 V15.1.0, Jul. 2018, 150 Pages.

ETSI: "Digital Cellular Telecommunications System (Phase 2+) (GSM); Universal Mobile Telecommunications System (UMTS); LTE; 3GPP System Architecture Evolution (SAE); Security Aspects ofNon-3GPP Accesses (3GPP TS 33.402 /Version 14.2.0 Release 14)," ETSI TS 133 402 V14.2.0, Jul. 2017, 72 Pages.

ETSI, LTE: "Evolved Universal Terrestrial Radio Access (E-UTRA); Radio Resource Control (RRC); Protocol specification (3GPP TS 36.331 version 15.3.0 Release 15)," ETSI TS 136 331 V15.3.0, Oct. 2018, pp. 604-607.

ETSI TS 124 302, "Universal Mobile Telecommunications System (UMTS); LTE; Access to the3GPP Evolved Packet Core (EPC) via Non-3GPP Access Networks; Stage3 (3GPP TS 24.302 version15. 3.0 Release15)," ETSI TS 124 302 V15. 3.0, Jun. 2018, 171 pages.

ETSI TS 136 331, "LTE, Evolved Universal Terrestrial Radio Access (E-UTRA), Radio Resource Control(RRC), Protocol Specification (3GPPTS36.331version15.3.0Release15)," ETSI TS 136 331 v15.3.0, Oct. 2018, pp. 230-239.

Funk P., et al., "Extensible Authentication Protocol Tunneled Transport Layer Security Authenticated Protocol Version 0 (EAP-TTLSv0)," Network Working Group, Request for Comments: 5281, Category: Informational, Aug. 2008, pp. 1-51.

Garzon J.P., et al., "5G Non-Public Networks: Standardization, Architectures and Challenges", in IEEE Access, vol. 9, Nov. 10, 2021, pp. 153893-153908.

"IEEE Standard for Information technology-Telecommunications and information exchange between systems-Local and metropolitan area networks-Specific requirements," Part 11: Wireless LAN Medium Access Control (MAC) and Physical Layer (PHY) Specifications Amendment 2: Fast Basic Service Set (BSS), computer Society, Sponsored by the LAN/MAN Standards Committee, IEEE std 802.11rTM-2008, Jul. 15, 2008, 126 Pages.

International Search Report and Written Opinion in Counterpart International Application No. PCT/US2021/024118, mailed Jun. 15, 2021, 14 Pages.

Johnson M., et al., "dLTE: Building a more WiFi-like cellular network: (instead of the other way around)", Proceedings of the 17th ACM Workshop on Hot Topics in Networks, Nov. 15, 2018, pp. 8-14.

Kaufman C., et al., "Internet Key Exchange Protocol Version 2 (IKEv2)," Internet Engineering Task Force (IETF), Request for Comments: 7296, Standards Track, Oct. 2014, pp. 1-142.

Simon D., et al., "The EAP-TLS Authentication Protocol," Network Working Group, Request for Comments: 5216, Obsoletes: 2716, Category: Standards Track, Mar. 2008, pp. 1-34.

Tabassam A. A., et al., "Fast and Seamless Handover for Secure Mobile Industrial Applications with 802.11 r", 2009 IEEE 34th Conference on Local Computer Networks, Zurich, Switzerland, Oct. 20-23, 2009, pp. 750-757.

Lake, D. et al, "Using Value Added Services to Realise the Benefits of Enterprise Small Cell Deployments," 9th International Conference on Next Generation Mobile Applications, Services and Technologies, Discussion and Prototype, https://ieeexplore.ieee.org/document/7373276, Sep. 2015, 6 pages.

* cited by examiner

To FIG. 2B

From FIG. 2B

From FIG. 2C

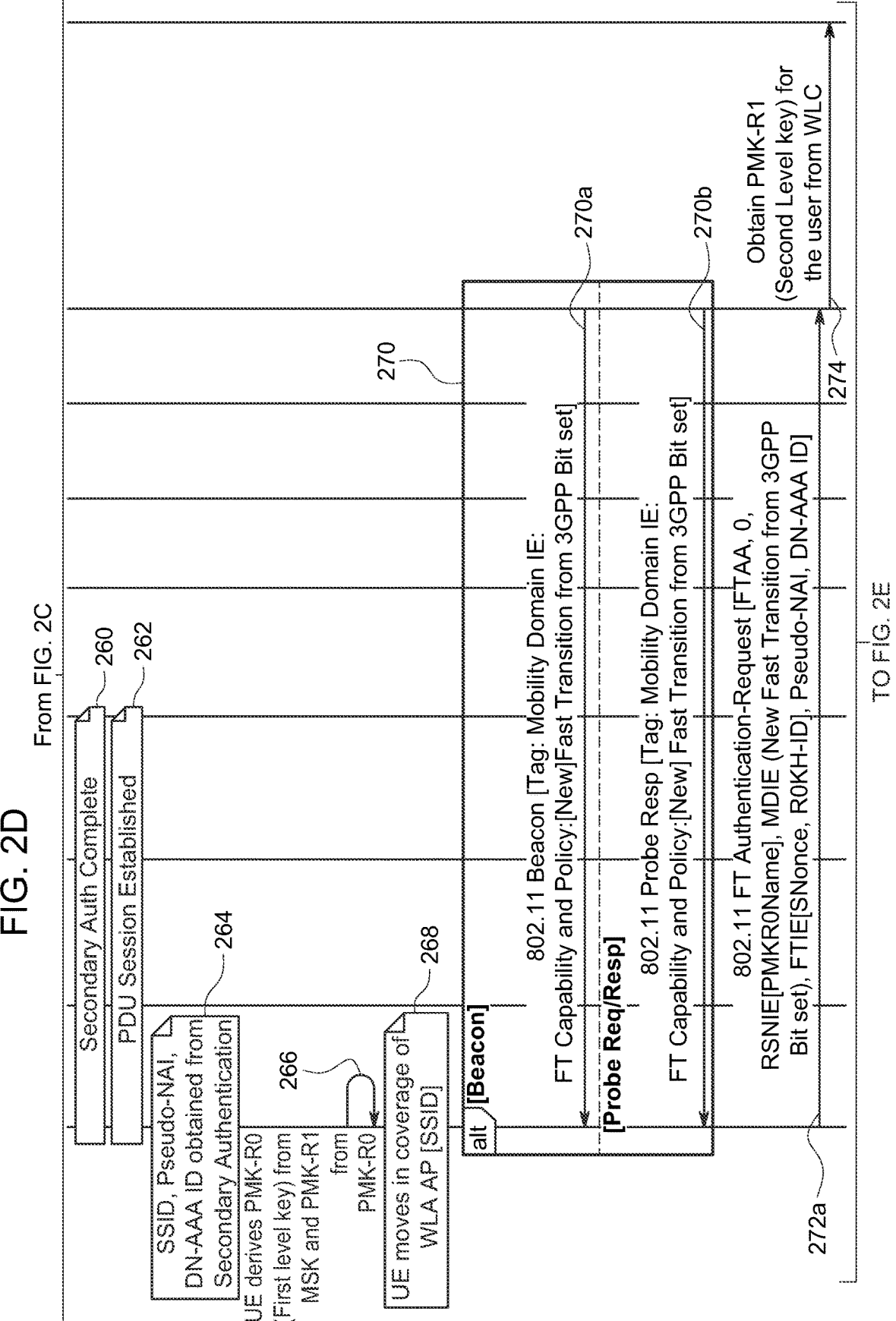

260 Secondary Auth Complete

262 PDU Session Established

264 SSID, Pseudo-NAI, DN-AAA ID obtained from Secondary Authentication

UE derives PMK-R0 (First level key) from MSK and PMK-R1 from PMK-R0 266

268 UE moves in coverage of WLA AP [SSID]

alt [Beacon]

802.11 Beacon [Tag: Mobility Domain IE: FT Capability and Policy:[New]Fast Transition from 3GPP Bit set] 270a

270

[Probe Req/Resp]

802.11 Probe Resp [Tag: Mobility Domain IE: FT Capability and Policy:[New] Fast Transition from 3GPP Bit set] 270b 802.11 FT Authentication-Request [FTAA, 0, RSNIE[PMKR0Name], MDIE (New Fast Transition from 3GPP Bit set), FTIE[SNonce, R0KH-ID], Pseudo-NAI, DN-AAA ID]

272a

274 Obtain PMK-R1 (Second Level key) for the user from WLC

TO FIG. 2E

From FIG. 2D

FIG. 4B

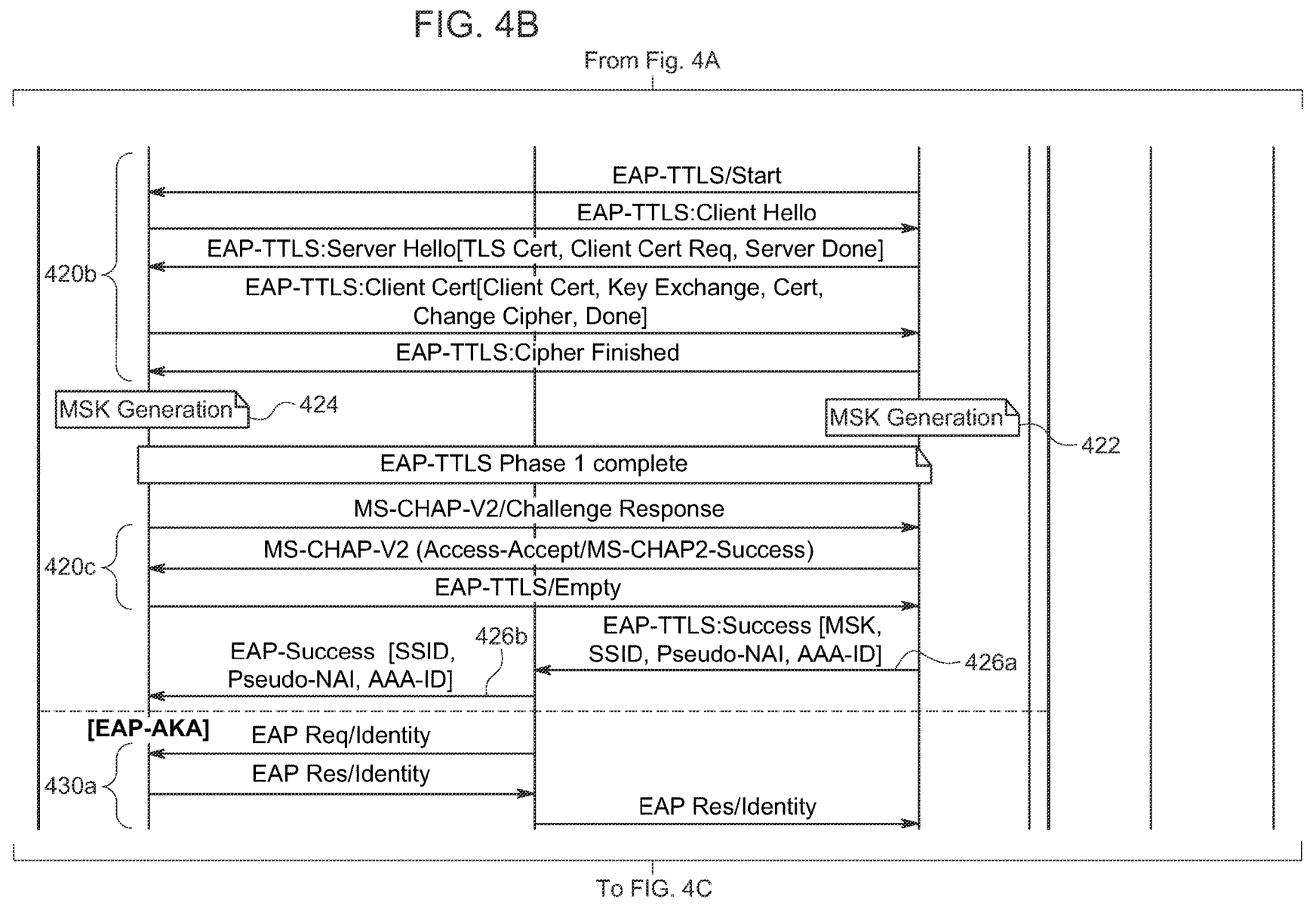

From Fig. 4A

EAP-TTLS/Start

EAP-TTLS:Client Hello

EAP-TTLS:Server Hello[TLS Cert, Client Cert Req, Server Done]

EAP-TTLS:Client Cert[Client Cert, Key Exchange, Cert, Change Cipher, Done]

EAP-TTLS:Cipher Finished

420b

424 — MSK Generation

EAP-TTLS Phase 1 complete

422 — MSK Generation

MS-CHAP-V2/Challenge Response

MS-CHAP-V2 (Access-Accept/MS-CHAP2-Success)

EAP-TTLS/Empty

420c

EAP-TTLS:Success [MSK, SSID, Pseudo-NAI, AAA-ID]

426a

EAP-Success [SSID, Pseudo-NAI, AAA-ID]

426b

[EAP-AKA]

EAP Req/Identity

EAP Res/Identity

EAP Res/Identity

Figure 4C:
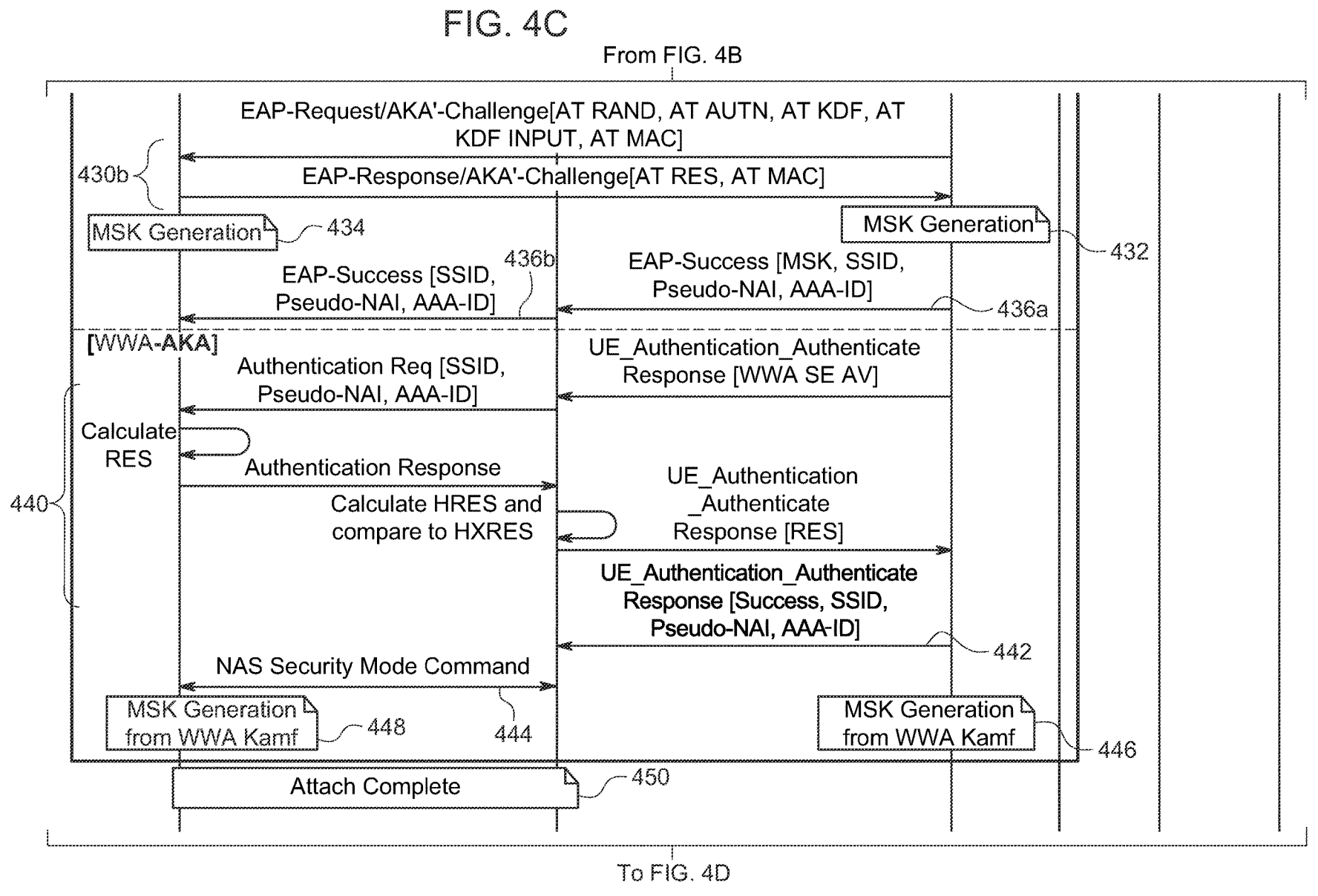

From FIG. 4B

EAP-Request/AKA'-Challenge[AT RAND, AT AUTN, AT KDF, AT KDF INPUT, AT MAC]

MSK Generation — 432

430b

MSK Generation — 434

EAP-Response/AKA'-Challenge[AT RES, AT MAC]

EAP-Success [MSK, SSID, Pseudo-NAI, AAA-ID] — 436a

EAP-Success [SSID, Pseudo-NAI, AAA-ID] — 436b

[WWA-AKA]

UE_Authentication_Authenticate Response [WWA SE AV]

Authentication Req [SSID, Pseudo-NAI, AAA-ID]

Calculate RES

Authentication Response

Calculate HRES and compare to HXRES

UE_Authentication_Authenticate_Response [RES]

UE_Authentication_Authenticate Response [Success, SSID, Pseudo-NAI, AAA-ID] — 442

MSK Generation from WWA Kamf — 446

NAS Security Mode Command — 444

MSK Generation from WWA Kamf — 448

Attach Complete — 450

From FIG. 4C

To FIG. 4E

From FIG. 4D

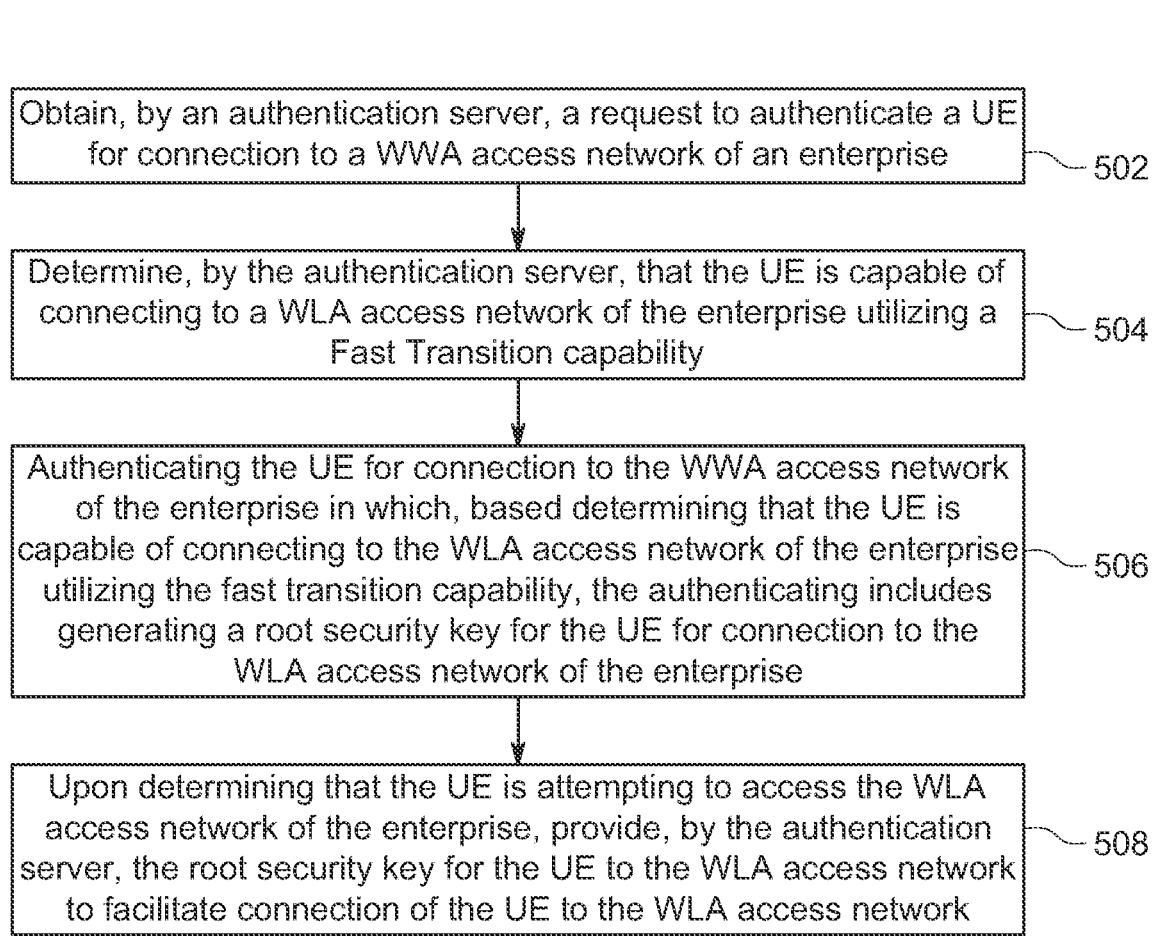

500

Obtain, by an authentication server, a request to authenticate a UE for connection to a WWA access network of an enterprise — 502

Determine, by the authentication server, that the UE is capable of connecting to a WLA access network of the enterprise utilizing a Fast Transition capability — 504

Authenticating the UE for connection to the WWA access network of the enterprise in which, based determining that the UE is capable of connecting to the WLA access network of the enterprise utilizing the fast transition capability, the authenticating includes generating a root security key for the UE for connection to the WLA access network of the enterprise — 506

Upon determining that the UE is attempting to access the WLA access network of the enterprise, provide, by the authentication server, the root security key for the UE to the WLA access network to facilitate connection of the UE to the WLA access network — 508

FIG. 5

TECHNIQUES TO GENERATE WIRELESS LOCAL AREA ACCESS NETWORK FAST TRANSITION KEY MATERIAL BASED ON AUTHENTICATION TO A PRIVATE WIRELESS WIDE AREA ACCESS NETWORK

PRIORITY CLAIM

This application is a continuation of and claims the benefit of priority to U.S. patent application Ser. No. 17/069,047, filed Oct. 13, 2020, and issued as U.S. Pat. No. 11,778,463 on Oct. 3, 2023, which application claims the benefit of priority under 35 U.S.C. § 119 to U.S. Provisional Application No. 63/002,516 filed Mar. 31, 2020, the entirety of which applications are incorporated herein by reference.

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases, efficient management of communication resources becomes more critical. In particular, there are significant challenges in facilitating transitions for users between different networks.

BRIEF DESCRIPTION OF THE DRAWINGS

FIGS. 2A, 2B, 2C, 2D, and 2E are a message sequence diagram illustrating a call flow associated with generating WLA access network FT key material based on authentication to a private WWA access network utilizing the system of FIG. 1, according to an example embodiment.

FIGS. 4A, 4B, 4C, 4D, and 4E are a message sequence diagram illustrating a call flow associated with generating WLA access network FT material based on authentication to a private WWA access network utilizing the system of FIG. 3, according to an example embodiment.

FIG. 5 is a flow chart depicting a method according to an example embodiment.

DESCRIPTION OF EXAMPLE EMBODIMENTS

Overview

Figure 1:
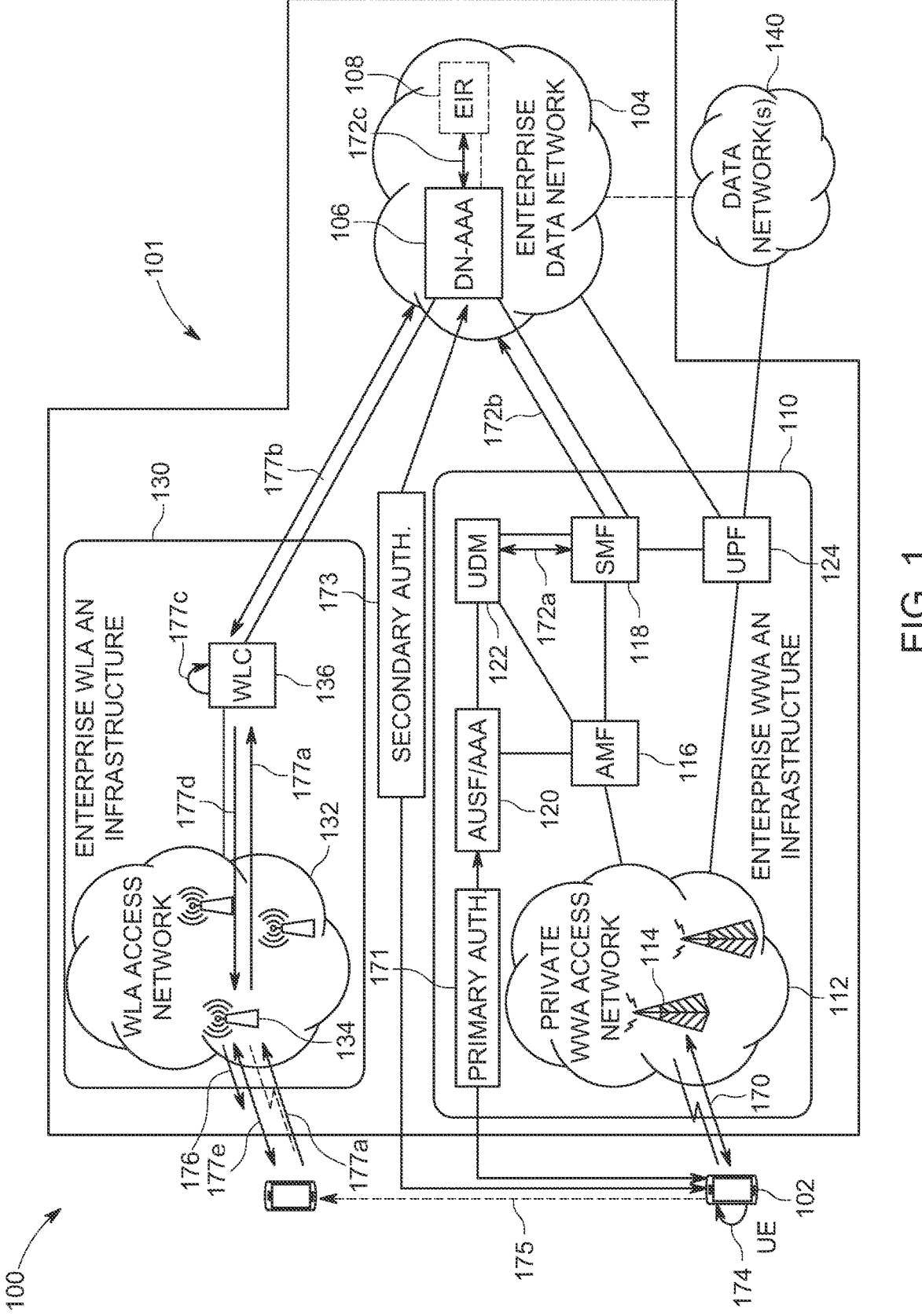
FIG. 1 is a diagram of a system in which techniques may be implemented to generate wireless local area (WLA) access network Fast Transition (FT) key material based on authentication to a private wireless wide area (WWA) access network, according to an example embodiment.

Techniques presented herein may provide for the ability to generate wireless local area (WLA) access network (e.g., Wi-Fi®, Wi-Fi6®, etc.) Institute of Electrical and Electronics Engineers (IEEE) 802.11r Fast Transition (FT) key material based on authentication to a private wireless wide area (WWA) access network (e.g., private cellular). In particular, two techniques are presented herein that in which a user equipment (UE) may utilize Third Generation Partnership Project (3GPP) generated Session Keys for accessing a WWA access network (AN) (e.g., Fifth Generation (5G) access network, next Generation (nG) access network, etc.) as seed to generate Fast Transition (FT) hierarchical keys that may be used for authenticating the UE to a WLA access network (e.g., Wi-Fi).

One technique may utilize 3GPP-generated Session Keys that are generated during a secondary authentication process while another technique may utilize 3GPP-generated Session Keys that are generated using a primary authentication process. For both techniques, any form of a Subscriber Identity Module (SIM)-based primary authentication process (e.g., 5G Authentication and Key Agreement (5G-AKA), Extensible Authentication Protocol (EAP)-AKA, etc.) or a non-SIM-based primary authentication process (e.g., EAP Transport Layer Security (EAP-TLS), EAP Tunneled TLS (EAP-TTLS), etc.) can be utilized, which may enable the UE to leverage Institute of Electrical and Electronics Engineers (IEEE) 802.11r messaging to associate to a WLA (e.g., Wi-Fi) access network, which may result in a large reduction of WLA connection establishment time.

In one embodiment, a method is provided that may include obtaining a request to authenticate a UE for connection to a WWA access network of an enterprise; determining that the UE is capable of connecting to a WLA access network of the enterprise utilizing a Fast Transition capability; authenticating the UE for connection to the WWA access network of the enterprise, wherein based on determining that the UE is capable of connecting to the WLA access network of the enterprise utilizing the Fast Transition capability, the authenticating includes generating a root security key for the UE for connection to the WLA access network of the enterprise; and upon determining that the UE is attempting to access the WLA access network of the enterprise, providing the root security key for the UE to the WLA access network to facilitate authentication/connection of the UE to the WLA access network.

EXAMPLE EMBODIMENTS

As referred to herein, an 'enterprise' or 'enterprise entity' may be considered to be a business, government, educational institution, an organization, and/or the like that may include multiple enterprise locations (or sites), such as a main campus, remote branches, and so on. Enterprise devices (e.g., enterprise user equipment (UE), etc.) that may be owned, operated, and/or otherwise associated with an enterprise may be utilized by enterprise users to serve enterprise purposes (e.g., business purpose, government purpose, educational/university purpose, etc.) of the enterprise. In some instances, an enterprise may operate an enterprise network, also referred to as an enterprise data network, which may be a network implemented to serve enterprise purposes (e.g., host enterprise applications/services/etc., perform authentications and/or authorizations, etc. for enterprise users associated with one or more UE, and/or the like).

Further as referred to herein, a wireless wide area (WWA) access network, such as a cellular/Third (3rd) Generation Partnership Project (3GPP) access networks, may be characterized as a Radio Access Network (RAN) having radio nodes such as evolved Node Bs (eNBs or eNodeBs) for Fourth (4th) Generation (4G)/Long Term Evolution (LTE) access networks, next generation Node Bs (gNB s or gNodeBs) for Fifth (5th) Generation (5G) and/or next Generation (nG) access networks, and/or the like that provide a larger RAN coverage area as compared to the RAN coverages area typically provided by wireless local area (WLA) radio nodes (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node is typically larger (sometimes orders of magnitude larger) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

In some instances, an access network, such as a WWA access network, may be referred to as a private access network. By 'private' it is meant that a private WWA access network (e.g., a Citizens Broadband Radio Service (CBRS) access network and/or a 3GPP cellular (4G/LTE, 5G, nG, etc.) access network) may provide network connectivity/ services to clients (e.g., users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers (e.g., AT&T®, etc.), enterprises network operators/ service providers (e.g., Cisco®, etc.), and/or third party network operators/service providers (e.g., neutral host network operators/service providers, cloud service providers, etc.). A private network may also be referred to as a standalone non-public network (SNPN) in some instances. Cisco is a registered trademark of Cisco Technology, Inc. AT&T is a registered trademark of AT&T Intellectual Property.

As industry moves closer towards private 3GPP WWA access network deployments (e.g., 4G/LTE, 5G, nG deployments) based on technologies such as CBRS and other shared spectrum bands in other regulatory domains, enterprises may deploy private 5G/LTE access networks for outdoor access (e.g., for areas such as campuses, parking lots, basement, ports, industrial areas, amusement parks, areas between buildings, etc.) while maintaining WLA access networks, such as Wi-Fi®, Wi-Fi6®, etc., for indoor access. It is reasonable to assume that both WWA and WLA radio access technologies will co-exist in many deployments in order to provide blanket coverage with no gaps. Thus, interworking between the control plane elements of these access networks with a unified policy layer may be advantageous to deliver better user experience.

For current systems, when a UE moves to a WLA access (e.g., a Wi-Fi access) from a 3GPP WWA access, the UE first has to establish IEEE 802.11 open authentication and association, followed by IEEE 802.1x authentication, and then followed by a 4-way handshake to derive encryption keys for communication establishment. These steps involve an exchange of multiple messages between the UE and the WLA access network and can result in a delay of up to 8-10 seconds before ports are unblocked for a WLA link (e.g., a Wi-Fi link) to for the UE to transmit or receive data.

With enterprises interested in the deployment of private WWA access networks, such as 4G/LTE and/or 5G/nG networks, there is a desire and opportunity to optimize the connection establishment to a WLA access network by leveraging key material generated from a UE's authentication to a WWA access network over a private 3GPP access.

With this objective in mind, presented herein are techniques that enable leveraging session keys generated via a 3GPP WWA access network connection (5G/LTE) and leveraging an IEEE 802.11r Fast Transition (FT) capability of a WLA access network infrastructure to derive fast roaming FT key material as a user/UE moves from a private 3GPP WWA access for an enterprise to a WLA access of the enterprise.

IEEE 802.11r (also referred to herein as '11r') introduces a new concept of roaming in which an initial handshake with a new Wi-Fi AP is performed even before the client roams to the target AP, which is called Fast Transition (FT) or Fast Basic Service Set (BSS) transition. This initial handshake allows the client and APs to reuse the master keys obtained during a prior authentication exchange within the same BSS/mobility domain.

Broadly, techniques herein may facilitate generating WLA access network (e.g., Wi-Fi®, Wi-Fi6®, etc.) IEEE 802.11r FT key material based on authentication to a private wireless wide area (WWA) access network (e.g., 5G, nG, etc.). The authentication may be a primary authentication or a secondary authentication, as discussed herein. FT key material, also referred to herein as 'FT hierarchical key material' and variations thereof, may include a first level FT key, such as a Pairwise Master Key R0 (PMK-R0) key, and a second level FT key, such as a PMK R1 (PMK-R1) key. The first level key, PMK-R0, is derived or generated using a root security key, such as a Master Session Key (MSK) generated for a UE utilizing an Extensible Authentication Protocol (EAP) MSK generation processes as defined at least by Internet Engineering Task Force (IETF) Request For Comments (RFC) 5247. The second level FT key, PMK-R1, is derived or generated from the PMK-R0, as also prescribed by RFC 5247.

Two techniques are presented herein that in which a UE may utilize 3GPP generated Session Keys for accessing a WWA AN (e.g., 5G access network, nG access network, etc.) as seed to generate FT hierarchical keys that may be used for authenticating the UE to a WLA access network (e.g., Wi-Fi). One technique may utilize 3GPP-generated Session Keys that are generated during a secondary authentication process while another technique may utilize 3GPP-generated Session Keys that are generated using a primary authentication process. For both techniques, any form of a SIM-based primary authentication process (e.g., 5G-AKA, EAP-AKA/EAP-AKA', etc.) or a non-SIM-based primary authentication process (e.g., EAP-TLS, EAP-TTLS, etc.) can be utilized, which may enable the UE to leverage 802.11r messaging to associate to a WLA (e.g., Wi-Fi) access network, which may result in a large reduction of WLA connection establishment time.

In some instances, utilization of techniques as described herein may result in a drastic reduction of connection establishment time to the WLA access (potentially upwards of a 90% reduction in connection time). This is a significant gain for latency sensitive applications (e.g., Ultra-Reliable Low-Latency Communication (URLLC) applications, industrial Internet of Things (IoT) applications, video applications, Augmented Reality/Virtual Reality (AR/VR) applications, cloud gaming applications, etc.) and may thereby greatly improve the real-time application experience in enterprise networks.

Referring to FIG. 1, FIG. 1 is a block diagram of a system 100 in which techniques may be implemented to generate WLA access network FT key material for a UE based on authentication of the UE to a private WWA access network, according to an example embodiment. In particular, system 100 illustrates features associated with a first technique in which a secondary authentication process may be utilized to generate FT key material for a UE based on authentication of the UE to an enterprise (private) WWA access network in which the FT key material may facilitate FT authentication for connection of the UE to an enterprise WLA access network.

System 100 includes a user equipment (UE) 102, an enterprise data network (DN) 104, an enterprise (private) WWA access network (AN) infrastructure 110, and an enterprise WLA AN infrastructure 130. Enterprise data network 104 may include a data network Authentication, Authorization, and Accounting (DN-AAA) server 106. In some embodiments, enterprise data network 104 may further include an equipment identity register (EIR) 108, which may interface with the DN-AAA server 106. One or more external data network(s) 140 are also shown in FIG. 1.

The enterprise WWA AN infrastructure 110 may include an enterprise (private) WWA AN 112, an Access and Mobility Management Function (AMF) 116, a Session Management Function (SMF) 118, an Authentication Server Function (AUSF) and/or AAA (AUSF/AAA) server 120, a User Data Management (UDM) entity 122 (referred to herein as UDM 122), and at least one User Plane Function (UPF) 124.

The private WWA AN 112 may include any number of WWA access nodes 114. The enterprise WLA AN infrastructure 130 may include a WLA AN 132 and a wireless local area network (LAN) controller (WLC) 136. The WLA AN 142 may include any number of WLA access nodes 134 (also referred to herein as APs).

In one instance, enterprise data network 104, the enterprise WWA AN infrastructure 110, and the WLA AN infrastructure 130 may collectively represent an enterprise network or domain 101, which may provide services to one or more enterprise devices, such as UE 102.

For the WWA AN infrastructure 110, AMF 116 and SMF 118 are control plane functions that may interface with each other. The AMF 116 may further interface with WWA access nodes 114 of the private WWA access network 112, the AUSF/AAA server 120, and the UDM 122. The SMF 118 may also interface with the UDM 122 and the UPF 124. The AUSF/AAA server 120 and UDM 122 may also interface. The UPF 124 is a user plane function for the WWA AN infrastructure 110 and may further interface with WWA access nodes 114 of the private WWA access network 112, as well as enterprise data network 104 and data network(s) 140.

Generally, the WWA AN infrastructure 110 may be configured to provide 3GPP private 4G/LTE, 5G/nG, and/or CBRS mobile network services via private WWA access network 112/WWA access nodes 114. WWA access nodes 114 may be implemented as any combination of a 4G/LTE, 5G, and/or nG radio devices such as eNBs/eNodeBs, gNBs/gNodeBs, and/or a CBRS radio devices (CBSDs) and may include any combination of hardware (e.g., communications units, receiver(s), transmitter(s), antenna(s) and/or antenna array(s), processor(s), memory element(s), baseband processor(s) (modems), etc.)], controllers, software, logic, and/or the like to facilitate over-the-air Radio Frequency (RF) WWA access network connections (e.g., 4G/LTE, 5G/nG, CBRS, etc. connections) with one or more UE, such as UE 102.

A UE, such as UE 102, may be associated with any user, subscriber, employee, client, customer, electronic device, etc. wishing to initiate a flow in system 100 and may be inclusive of any device that initiates a communication in system 100, such as a computer, an electronic device such as an industrial device, automation device, enterprise device, appliance, Internet of Things (IoT) device, etc., a laptop or electronic notebook, a cellular/Wi-Fi® enabled telephone/smart phone, tablet, etc. and/or any other device, component, element, or object (e.g., a dual connection enabled device) capable of initiating voice, audio, video, media, or data exchanges within system 100. It is to be understood that UE 102 may also be configured with any combination of hardware (e.g., communications units, receiver(s), transmitter(s), antenna(s) and/or antenna array(s), processor(s), memory element(s), baseband processor(s) (modems), etc.)], controllers (e.g., wireless local area network controllers, etc.), software, logic, and/or any other elements/entities that may facilitate over the air RF connections with one or more access networks.

In addition to various operations discussed for techniques herein, AMF 116 may provide access authentication services, authorization services, and mobility management control for one or more UE, such as UE 102, to facilitate one or more over-the-air RF connection(s) between the UE and private WWA access network 112/WWA access node(s) 114. In addition to various operations discussed for techniques herein, SMF 118 may be responsible for UE Protocol Data Unit (PDU) sessions or Session Management (SM), with individual functions/services being supported on a per-session basis, and also for selection and control of a UPF (e.g., UPF 124) to facilitate data transfer(s) between a UE and one or more data network(s), such as enterprise data network 104 and/or data network(s) 140. Generally, UPF 124 may operate to provide routing and forwarding operations for user data traffic and may also perform a variety of functions/services including, but not limited to, packet inspection, traffic optimization, Quality of Service (QoS), billing, policy enforcement, and/or billing operations (e.g., accounting, etc.) for UE sessions.

An authentication server such as AUSF/AAA server 120 is typically associated with 3GPP 5G/nG mobile network implementations. Typically, the AUSF/AAA server 120 facilitates primary authentication for authenticating a device, such as UE 102, to connect to the private WWA access network 112/WWA access node 114. A UDM, such as UDM 122, is also typically associated with 3GPP 5G/nG mobile network implementations. Typically, the UDM 122 stores subscription data for subscribers (e.g., UE 102) that can be retrieved and/or otherwise obtained/utilized by one or more network elements of enterprise WWA AN infrastructure 110 to facilitate authentication, services, etc. for subscribers.

In addition to various operations discussed herein, an authentication server, such as DN-AAA 146, may facilitate any combination of authentication, authorization, and/or accounting services for secondary authentication processes that may be utilized via any combination of authentication/authorization protocols such as Remote Authentication Dial- In User Service (RADIUS), Diameter, EAP [including any EAP variations], combinations thereof, and/or the like.

Generally, authentication refers to a process in which an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity, typically inherited from authentication when logging on to an application or service. In various instances, authorization may be determined based on a range of restrictions, for example time-of-day restrictions, or physical location restrictions, or restrictions against multiple accesses by the same entity or user/device. Generally, accounting refers to the tracking of network resource consumption by users/devices for the purpose of capacity and trend analysis, cost allocation, billing, etc.

For the enterprise WLA AN infrastructure 130, WLC 136 may interface with DN-AAA server 106 of the enterprise data network 104 as well as the WLA access nodes (APs) 134 of the WLA access network 132. The WLC 136 may also interface with data network(s) 140. In various embodiments, WLA access nodes 134 may be inclusive of a WLA radio device, such as a Wi-Fi/Wi-Fi6 access point and/or the like that may facilitate over-the-air RF connections for WLA access network 132. WLC 136 may provide/be responsible for WLA access network functions such as WLA access network-based access authentication services, authorization services, intrusion prevention, RF management, and/or the like to facilitate UE 102 connectivity via the WLA access network 132 utilizing the one or more WLA access nodes (APs) 134. In some implementations, WLC 136 may be configured as an evolved WLC (eWLC).

In various embodiments, data network(s) 140 may be any combination of the Internet, an Internet Protocol (IP) Multimedia Subsystem (IMS), Ethernet network, Ethernet switching system(s), and/or the like. In some instances, enterprise data network 104 may overlap in whole or in part with data network(s) 140.

To illustrate various features of system 100 that may be utilized to provide for the ability to generate WLA access network 802.11r FT key material based on authentication to the private WWA access network 112 (e.g., utilizing primary and secondary authentication processes), consider various example operations 170, 171, 172 (172a and one of 172b or 172c), 173, 174, 175, 176, and 177 (177a, 177b, 177c, 177d, and 177e) discussed herein below. For the operations discussed for system 100, consider that UDM 122 is configured with a subscription profile for an enterprise user associated with UE 102 that: indicates that a secondary authentication process is to be performed for the UE 102 (e.g., 'Secondary Auth=YES'); includes an identifier for the secondary authentication realm (e.g., 'Secondary Auth Realm=Enterprise.com' identifying the realm for enterprise data network 104); and, optionally, may include an indication that UE 102 is 11r FT capable.

At 170, consider that UE 102 seeks to attach/connect to the private WWA access network 112 via WWA access node 114. For the attachment, UE 102 provides an indication to the private WWA access that it supports the 802.11r FT capability. In various embodiments, the 11r FT capability may be provided in an Information Element (IE), one or more bit(s), byte(s), string(s), flag(s), and/or the like within a message communicated to the enterprise WWA AN infrastructure 110. For example, in one embodiment, the UE may provide the indication that it supports the 11r FT capability by setting a bit in a 5G system (5GS) Update IE in a Registration Request. Alternatively, in one embodiment, the 11r FT capability could be indicated in an EAP attribute by the UE 102 to the WWA AN infrastructure 110 during via an EAP Identity-Response message.

For attachment/connection of UE 102 to the private WWA access network 112, a primary authentication process 171 is performed for the UE 102 via AUSF/AAA server 120. The primary authentication process 171 may involve any SIM-based primary authentication process such as 5G-AKA, EAP-AKA/EAP-AKA', or the like or non-SIM-based primary authentication process such as EAP-TLS, EAP-TTLS, or the like.

During PDU session establishment for UE 102 connection to the private WWA access 112, SMF 118 fetches the UE 102 subscription information/profile from UDM 122, as shown at 172a, in order to determine that the secondary authentication process is to be initiated for UE 102 (e.g., 'Secondary Auth=YES') with an external secondary network, such as via DN-AAA server 106 for enterprise data network 104, and that the UE 102 is 11r FT capable in order to determine that MSK generation is to be provided for the UE 102 to connect to the WLA access network 132.

In at least one embodiments, as shown at 172b, the SMF 118 exchanges the UE 102 11r FT capability with the DN-AAA server 106 over RADIUS. However, in another embodiment, DN-AAA server 106 may obtain an indication of the UE 11r FT capability as part of UE subscription information in the secondary network, for example, obtained from the EIR 108, as shown at 172c. In another embodiment, the UE 102 may indicate its FT capability to the AMF 116 during the primary authentication process. Through the PDU session establishment and subsequent to the primary authentication process 171, UE 102 performs and completes a secondary authentication process with the DN-AAA server 106, as shown at 173, that is authorized for the enterprise realm (e.g., 'Enterprise.com').

The UE 102 and the DN-AAA server 106 each generate a Master Session Key (MSK) during the 3GPP secondary authentication (e.g., EAP-based) procedure 173. Upon successful completion of the secondary authentication process 173, the DN-AAA server 106 provides to the UE 102, via an EAP-SUCCESS message, a network identifier for the WLA access network 142, such as a Service Set Identifier (SSID) (e.g., 'enterprise LA'). The DN-AAA server 106 also provides a pseudo-Network Access Identifier (pseudo-NAI) for the UE 102, and a DN-AAA identifier (DN-AAA ID) for DN-AAA server 106. In at least one embodiment, the pseudo-NAI for the UE 102 may be any unique identifier for the UE 102 (e.g., 'user@realm') that may be in International Mobile Subscriber Identity (IMSI) bits for the UE 102 that may be used to identify the UE within system 100. The encoding of a pseudo-NAI to IMSI can be implementation specific. In at least one embodiment, as there may be multiple AAA servers present in system 100, and the DN-AAA ID may be any unique identifier that may be used to identify DN-AAA server 106 within the system. In various embodiments, an AAA ID, such as the DN-AAA ID for DN-AAA server 106 or an AAA-ID for AUSF/AAA (as discussed below for FIG. 3), may be any alphanumeric string/value, binary value, hexadecimal value, a Fully Qualified Domain Name (FQDN) (e.g., dnaaa.enterprise.com), an IP address, and/or the like that can be used to uniquely identify the DN-AAA server 106 within enterprise data network 104.

As shown at 174, the UE 102 can derive and store the FT hierarchical keys for the target SSID for the WLA access network 132, which may include deriving the first level FT key, PMK-R0, from the MSK root security key and deriving the second level FT key PMK-R1 from the PMK-R0.

At 175, consider that UE 102 moves from the private WWA access network 112 nearer to the WLA access network 132, in particular, to within connection range to the WLA access node 134.

As shown at 176, WLA access nodes 134 may provide (transmit) an indication that the WLA access network 132 supports the Fast Transition capability. In various embodiments, the indication can be provided by the WLA access nodes 134 (APs) in a Mobility Domain IE (MDIE) (e.g., a 'Fast Transition from 3GPP' bit set in the MDIE) via a broadcast beacon and/or via a probe response. Obtaining the indication by the UE may trigger the UE to perform an FT 4-way handshake with the WLA access network rather than a standard 802.11 4-way handshake.

At 177*a*, upon determining that the WLA access network 132 supports the Fast Transition capability, UE 102 initiates authentication and association to the WLA access network 132/WLA access node 134 for the first time using an 802.11 FT Authentication-Request (instead of a typical 802.11 Association message) with a new 'Fast Transition from 3GPP' bit set in a MDIE for the 802.11 FT Authentication-Request. The FT Authentication-Request also includes an FT key index that is provided to the WLA access node 132 as well as the pseudo-NAI for UE 102 and the DN-AAA ID for DN-AAA server 106. In the FT key hierarchy, PMK-R1, for example, is generated from PMK-R0. After a client handover to a new AP, if the client and the new AP agree upon generating a new PMK-R1 from the same PMK-R0 key, the index is 1. But if another key is generated again, the index is incremented (e.g., to 2). As long as both the peers have the same understanding on the FT key index, they will arrive at the same key value.

Using the DN-AAA ID, WLC 136 identifies and queries DN-AAA server 106, as shown at 177*b*, using the pseudo-NAI for UE 102 in order to obtain the MSK from DN-AAA server 106 for UE 102. At 177*c*, WLC 136 derives/generates the first level FT key, PMK-R0, from the MSK and the second level FT key, PMK-R1, from the first level FT key. At 177*d*, WLC 136 transmits the PMK-R1 to the WLA access node 134 and, at 177*e*, UE 102 association to the WLA access network 132 completes using the 11r FT authentication and association in which the UE 102 completes a FT 4-way handshake with the WLA access node 134 to develop the Pairwise Transit Key Security Association (PTKSA) for the WLA access node 134.

Accordingly, the techniques illustrated for FIG. 1 may reduce authentication time to the WLA access network 132 to milliseconds and the user associated with UE 102 is unlikely to experience an interruption of service for ultra-latency sensitive applications as the user moves from a 3GPP access (e.g., 5G/nG) using secondary authentication to a WLA access (e.g., Wi-Fi/Wi-Fi6).

Referring to FIGS. 2A, 2B, 2C, 2D, and 2E, FIGS. 2A, 2B, 2C, 2D, and 2E are a message sequence diagram illustrating a call flow 200 associated with generating WLA access network FT key material based on authentication to a private WWA access network utilizing the system of FIG. 1, according to an example embodiment. FIGS. 2A-2E include UE 102, DN-AAA server 106, AMF 116, SMF 118, AUSF/AAA server 120, UDM 122, UPF 124, WLA access node 134, and WLC 136.

For the embodiment of FIGS. 2A-2E, consider that UDM 122 is configured with a subscription profile for the enterprise user associated with UE 102 that: indicates that a secondary authentication process is to be performed for the UE 102 (e.g., 'Secondary Auth=YES'); includes an identifier for the secondary authentication realm (e.g., 'Secondary Auth Realm=Enterprise.com' identifying the realm for enterprise data network 104); and, optionally, may include an indication that UE 102 is 11r FT capable.

At 202, consider that a Radio Resource Control (RRC) connection is established for UE 102 and, at 204, UE 102 communicates a Registration Request to AMF 116 (via WWA access node 114) in which the Registration Request can optionally include an indication that the UE 102 supports an 802.11r Fast Transition (FT) capability.

At 206, a primary authentication process via the private WWA access network 112 is performed between UE 102 via AUSF/AAA server 120 using any SIM-based (e.g., 5G-AKA) or non-SIM-based (e.g., EAP-TLS, EAP-TTLS, EAP-AKA/EAP-AKA', etc.) procedure. At 208, Non-Access Stratum (NAS) security establishment is performed between UE 102 and AMF 116. At 210*a*, consider that UE 102 transmits a PDU session establishment request that is obtained by AMF 116, which AMF 116 forwards at 210*b* to SMF 118.

Obtaining the PDU session establishment request triggers SMF 118 to fetch the subscription policy for the enterprise user associated with UE 102 from UDM 122, as shown at 212, to determine whether secondary authentication is to be performed for UE 102 and, if so, to obtain the secondary authentication realm information, and, optionally, the 11r capability information for UE 102. In at least one embodiment, the SMF 118 can query the UDM 122 using the International Mobile Subscriber Identity (IMSI), Subscription Concealed Identifier (SUCI), NAI (e.g., Id@enterprise.com), and/or any other identifier for the enterprise user/UE 102.

At 214, UDM 122 performs a lookup for the subscription policy based on the SMF 118 query and, based on a successful lookup (e.g., the policy is found for enterprise user/UE 102) provides a response to SMF 118, as shown at 216, with subscription information for UE 102 including, but not limited to: the indication that the secondary authentication process is to be performed for the UE 102 (e.g., 'Secondary Auth=YES'); the identifier for the secondary authentication realm (e.g., 'Secondary Auth Realm=Enterprise.com'); and, optionally, an indication that the UE 102 is 11r capable.

Upon obtaining the response at 216 that identifies that the secondary authentication process is to be performed for UE 102, SMF 118 initiates EAP authentication for the PDU session for UE 102, as shown at 218, which include SMF 118 transmitting to UE 102, at 220, an EAP-Request for the identity information of UE 102 that is to be used for the secondary authentication process, 'EAP-Request/Identity', in which the EAP-Request identifies the enterprise realm (e.g., @enterprise.com). At 222, UE 102 responds with an EAP-Response including the identity, 'EAP-Response/Identity', such as 'id@enterprise.com', for example. In some instances, the UE 102 may also respond with an indication that it has the 11r FT capability (e.g., for an implementation in which subscription information for the UE obtained at 212 does not include information regarding the capability or for an implementation in which the DN-AAA 106 is to obtain the FT capability from the EIR 108).

At 224, SMF 118 triggers N4 session establishment with UPF 124 for UE 102 that includes sending to UPF 124 over RADIUS, at 226, the EAP-Response/Identity as obtained from UE 102 and, optionally, the indication that UE 102 has the 11r FT capability. At 228, UPF 124 triggers an EAP secondary authentication process over RADIUS to the DN- AAA server 106, which, in some embodiments may include the indication that UE 102 is 11r FT capable. However, in other embodiments, DN-AAA server 106 may obtain the information regarding 11*r* FT capability of UE 102 from EIR 108.

Figure 2A:
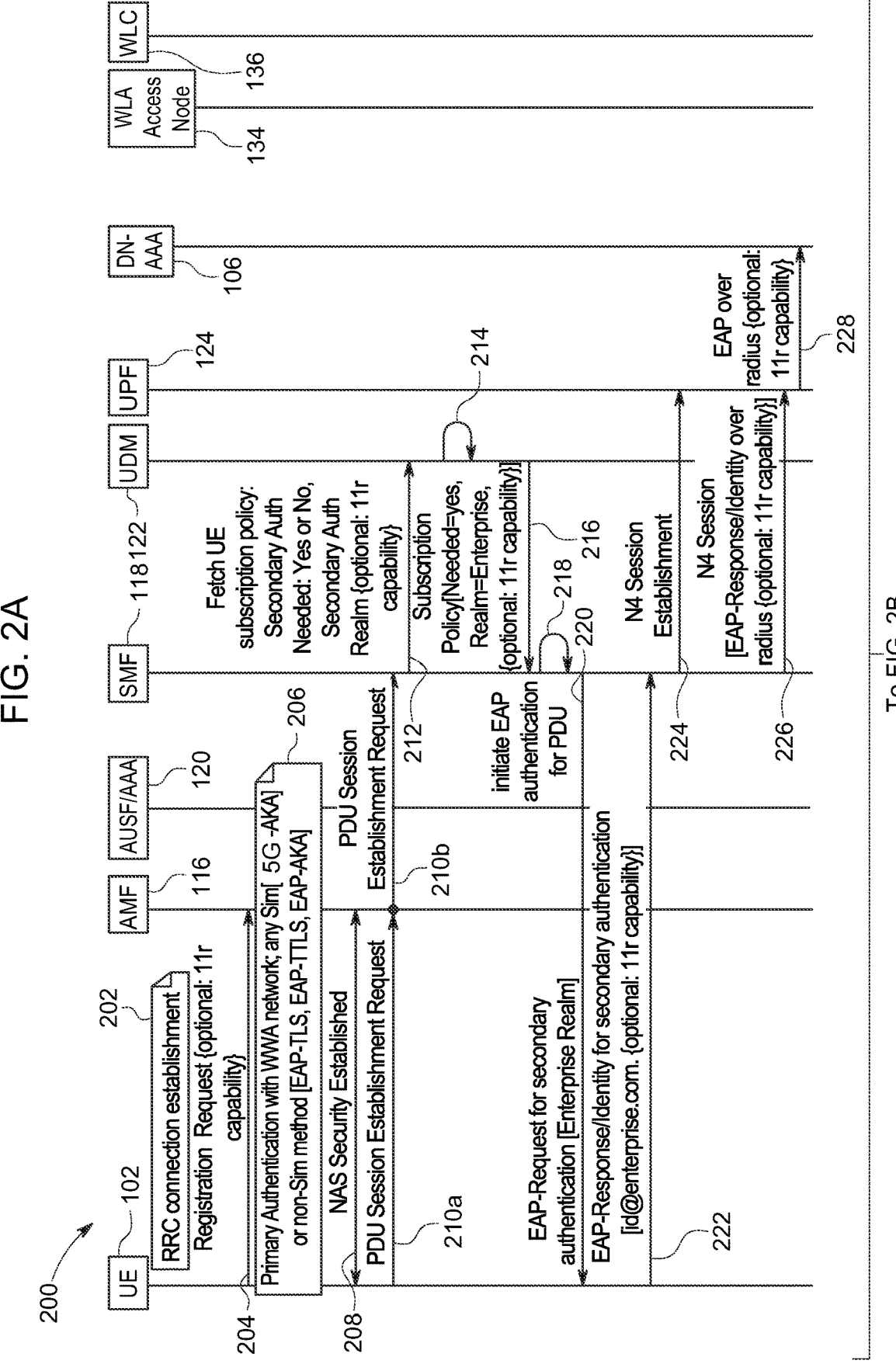

Various types of EAP authentication can be performed for the secondary authentication process including, but not limited to EAP-TLS, EAP-TTLS, or EAP-AKA/EAP-AKA', which are discussed with reference to various optional operations as shown in FIG. 2A.

Figure 2B:
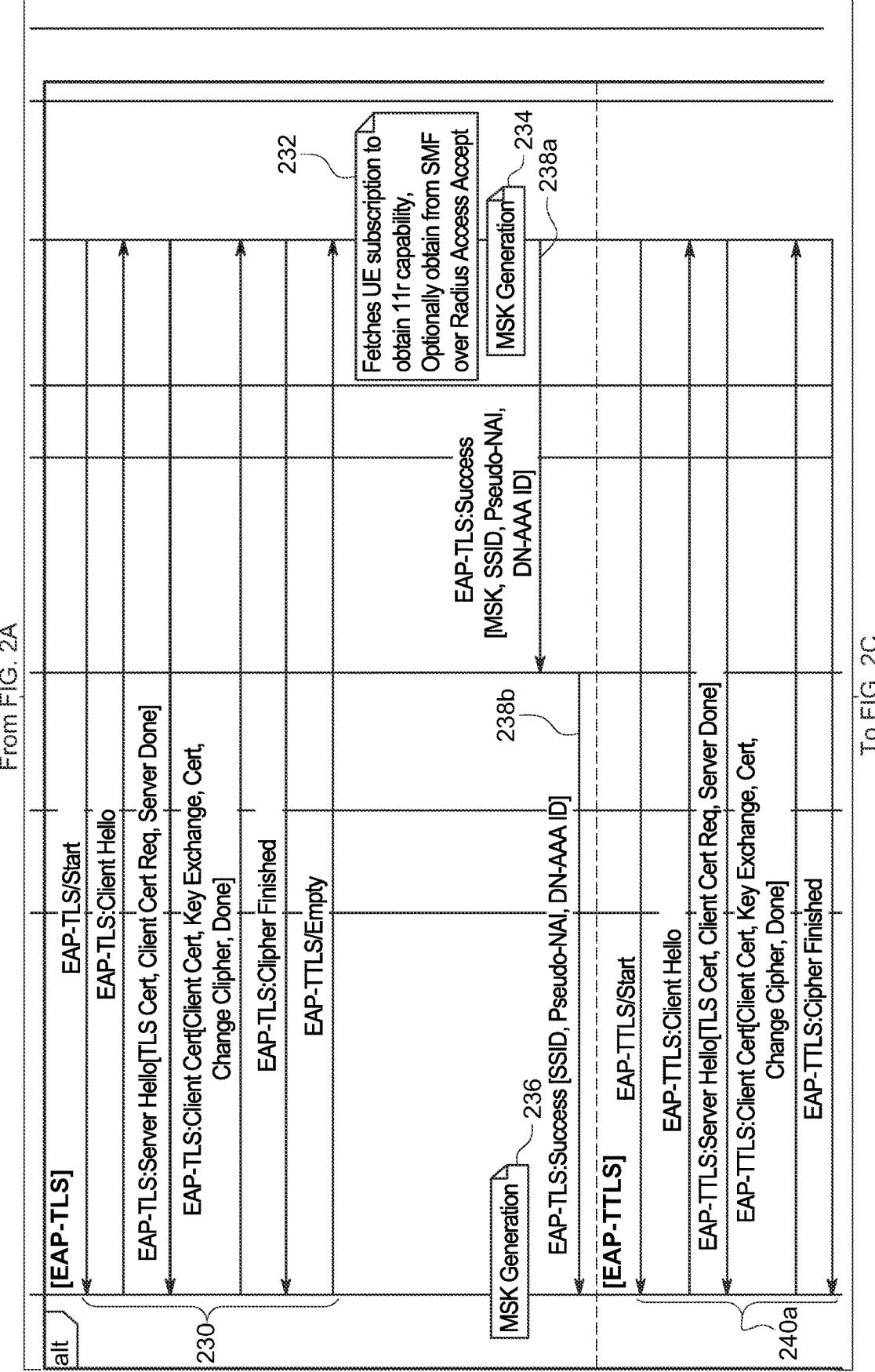
Figure 2C:
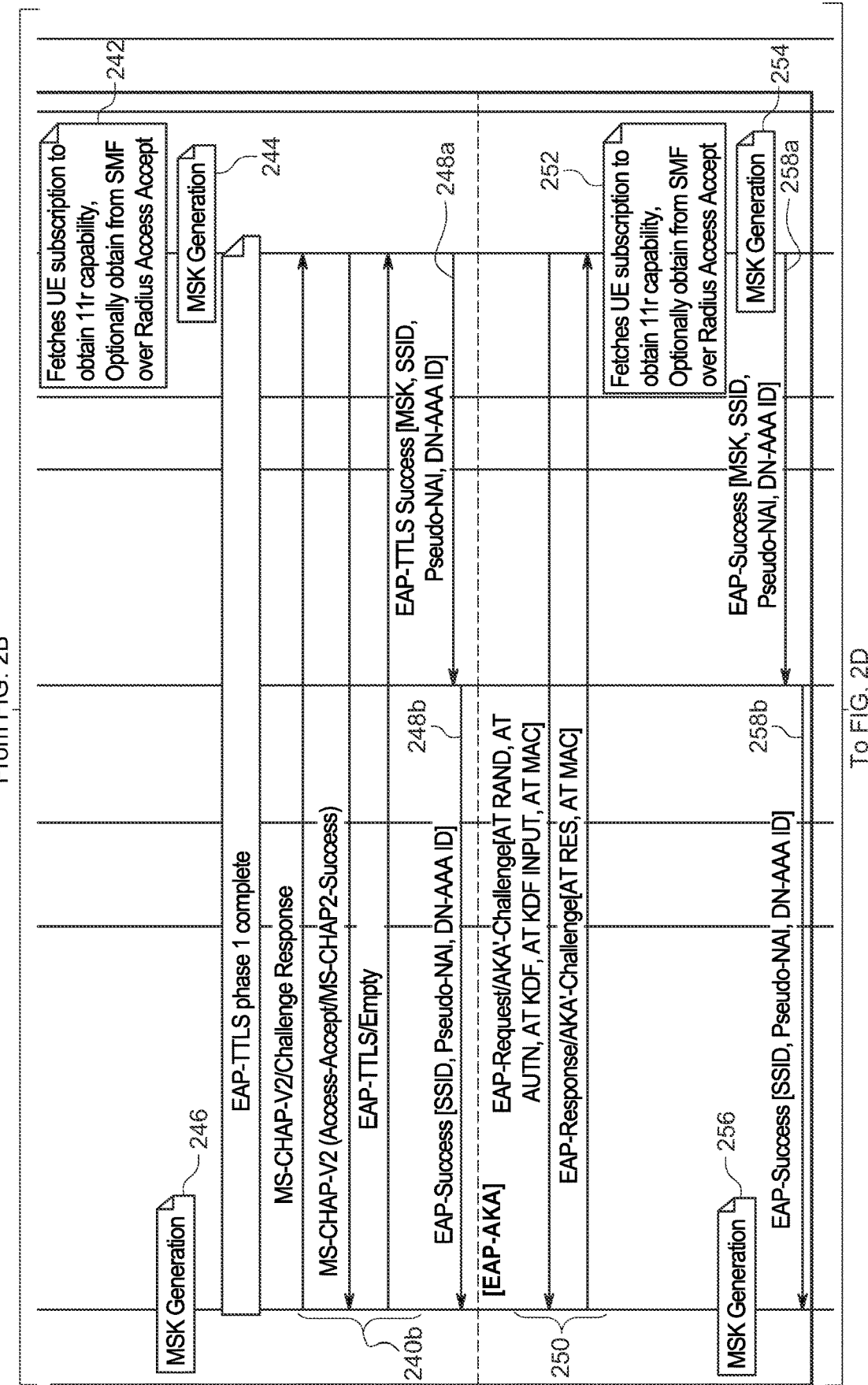

For an EAP-TLS authentication, for example, an initial EAP-TLS exchange process 230 can be performed between UE 102 and DN-AAA server 106, as shown in FIG. 2B, in which the EAP-TLS exchange process 230 may be performed as prescribed at least by IETF RFC 5216. Following exchange process 230, the DN-AAA server 106 performs MSK generation, as shown at 234, to generate an MSK (e.g., root security key) for the UE 102 for connection to the WLA access network 132 and UE 102 also performs MSK generation, as shown at 236, to generate the MSK for the UE 102 connection to the WLA access network 132. Following MSK generation, as shown at 238a, DN-AAA server 106, communicates an EAP-TLS Success message to SMF 118 that includes the MSK, the SSID for the WLA access network 132 (e.g., 'enterpriseWLA'), a pseudo-NAI for the UE 102, and an identifier for the DN-AAA server 106 (DN-AAA ID), and the SMF 118 forwards the message to UE 102, as shown at 238b, including the SSID, the pseudo-NAI, and the DN-AAA ID. The UE 102 may store/maintain an association between MSK that it has generated and the SSID for the WLA access network, the pseudo-NAI, and the DN-AAA in order to perform an 11r FT authentication to the WLA access network 132, as discussed below.

In some embodiments if the UE 102 does not provide an indication that it has the 11r FT capability, the DN-AAA server 106 may fetch subscription information for the UE 102, as shown at 232 via the EIR 108, which may interface with DN-AAA server 106, and store subscription information for users/UE associated with/managed by the enterprise entity. Determining the 11r FT capability for UE 102 can trigger the DN-AAA server 106 to perform the MSK generation and provide the SSID, pseudo-NAI, and AAA-ID to the UE 102.

In another example for an EAP-TTLS authentication, a Phase 1 EAP-TTLS exchange process 240a and a Phase 2 EAP-TTLS exchange process 240b can be performed between the UE 102 and the DN-AAA server 106 as prescribed at least by IETF RFC 5281. For the Phase 1 EAP-TTLS exchange process 240a, MSK generation can be performed by the DN-AAA server 106 at 244 and the UE 102 at 246. Continuing to FIG. 2C, the optional operations at 242 may be performed by DN-AAA server 105 as discussed above at 232. Following completion of the Phase 1 EAP-TTLS exchange process 240a, the Phase 2 EAP-TTLS exchange process 240b is performed, which results in DN-AAA server 106, communicating an EAP-TTLS Success message to SMF 118, as shown at 248a, that includes the MSK, the SSID for the WLA access network 132, a pseudo-NAI for the UE 102, and an identifier for the DN-AAA server 106 (DN-AAA ID), and the SMF 118 forwards the message to UE 102, as shown at 248b, including the SSID, the pseudo-NAI, and the DN-AAA ID. The UE 102 may store/maintain an association between the MSK that it has generated and the SSID for the WLA access network, the pseudo-NAI, and the DN-AAA ID in order to perform an 11r FT authentication to the WLA access network 132, as discussed below.

In yet another example for an EAP-AKA/EAP-AKA' authentication, an initial EAP-AKA/EAP-AKA' exchange process 250 can be performed between UE 102 and DN-AAA server 106 as prescribed at least by IETF RFC 3748, 4187, and 5448. MSK generation can then be performed by the DN-AAA server 106 at 254 and the UE 102 at 256. The optional operations at 252 may be performed by DN-AAA server 106 as discussed above at 232. Following the MSK generation, as shown at 258a, DN-AAA server 106, communicates an EAP-Success message to SMF 118 that includes the MSK, the SSID for the WLA access network 132, a pseudo-NAI for the UE 102, and an identifier for the DN-AAA server 106 (DN-AAA ID), and the SMF 118 forwards the message to UE 102, as shown at 258b, including the SSID, the pseudo-NAI, and the DN-AAA ID. The UE 102 may store/maintain an association between the MSK that it has generated and the SSID for the WLA access network, the pseudo-NAI, and the DN-AAA ID in order to perform 11r FT authentication to the WLA access network 132, as discussed below.

Thus, various EAP exchanges may be performed in order to complete a secondary authentication process for a UE, as shown at 260 for FIG. 2D, in accordance with embodiments herein.

Continuing to 262, the PDU session is established for UE 102 via SMF 118. As shown at 264, UE 102 stores/maintains an association between the MSK that was generated for the secondary authentication process and the SSID for the WLA access network 232, the pseudo-NAI, and the DN-AAA ID for DN-AAA server 106. At 266, UE 102 derives/generates the first level FT key, PMK-R0, from the MSK and the second level FT key PMK-R1 from the PMK-R0.

Consider at 268 that the UE 102 moves into the coverage of the WLA access node 134, which broadcasts the SSID for the WLA access network 132 (e.g., 'enterpriseWLA'). At 370, consider that the WLA access network 132, via WLA access node 134, provides an indication that the WLA access network 132 supports the 11r FT capability. For example, in at least one embodiment as shown at 270a, the WLA access node 134 may broadcast an 802.11 Beacon that includes an FT capability and policy tag within the Mobility Domain IE (MDIE) with a bit set that indicates that the WLA access network 132 supports Fast Transition from a 3GPP (e.g., WWA) access. In another example, in at least one embodiment as shown at 270b, the WLA access node 134 may transmit an 802.11 Probe Response that includes an FT capability and policy tag within the MDIE with a bit set that indicates that the WLA access network 132 supports Fast Transition from a 3GPP (e.g., WWA) access.

Obtaining the indication by the UE 102 that the WLA access network supports the 11r FT capability may trigger the UE 102 to initiate, at 272a, an FT 4-way handshake with WLA access node 134 to derive encryption keys for communication establishment for UE 102 to the WLA access network 132 rather than performing a standard 802.11 4-way handshake. For example, at 272a, the UE 102 initiates an 802.11 FT Authentication-Request that includes, among other information, an MDIE including the Fast Transition from 3GPP bit set, the pseudo-NAI for UE 102, and the DN-AAA ID for DN-AAA server 106, which may trigger WLA access node 134 to query WLC 136 in order to obtain the PMK-R1 for UE 102, as shown at 274, in which the query includes the DN-AAA ID for DN-AAA server 106 and the pseudo-NAI for UE 102.

Figure 2E:
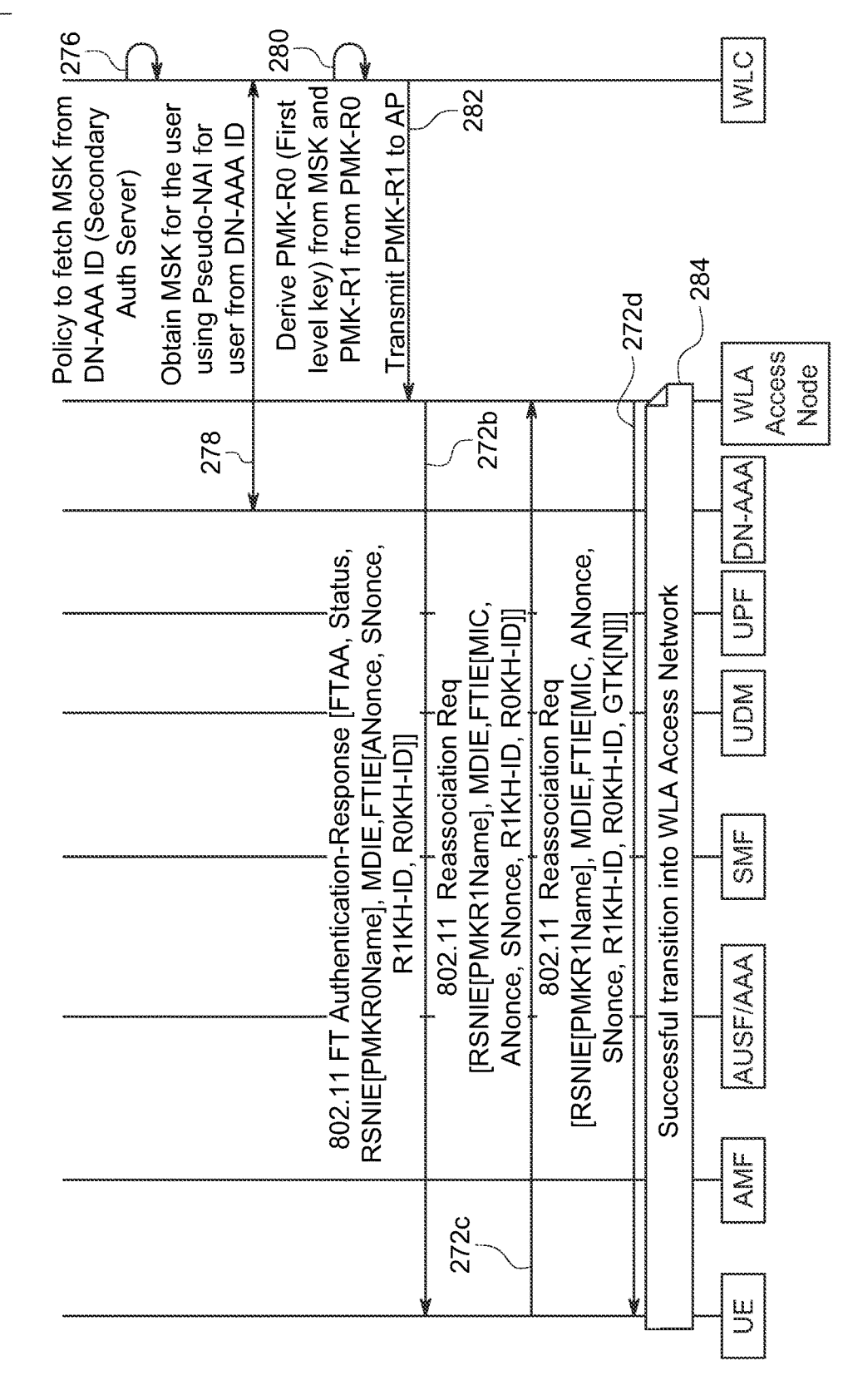

Continuing to FIG. 2E, at 276, WLC 236 determines, based on a local policy configured by the enterprise entity that it is to fetch the MSK for UE 102 from the secondary authentication server, DN-AAA server 106, as identified by the DN-AAA ID. Based on the policy and the DN-AAA ID, at 278, WLC 136 identifies and queries DN-AAA server 106 to obtain the MSK for UE 102 using the pseudo-NAI for UE 102. As shown at 280, WLC 136 derives/generates the first level FT key, PMK-R0, from the MSK and the second level FT key, PMK-R1, from the PMK-R0.

At 282, WLC 136 transmits the PMK-R1 to the WLA access node 134, which triggers the WLA access node 134 to complete the FT 4-way handshake with UE 102, as shown at 272*b*, 272*c*, and 272*d*, in order to derive encryption keys for communication establishment for UE 102 to the WLA access network 132. Successful completion of the FT 4-way handshake with UE 102 results in successful transition of the UE to the WLA access network 132, as shown at 284.

Accordingly, the techniques illustrated in FIGS. 1, 2A-2E may provide for the ability to utilize 3GPP-generated Session Keys (e.g., root security keys such as MSKs) that are generated during a secondary authentication process for a UE via a private WWA access network in which the keys can be leveraged to facilitate connection of the UE to a WLA access network.

Figure 3:
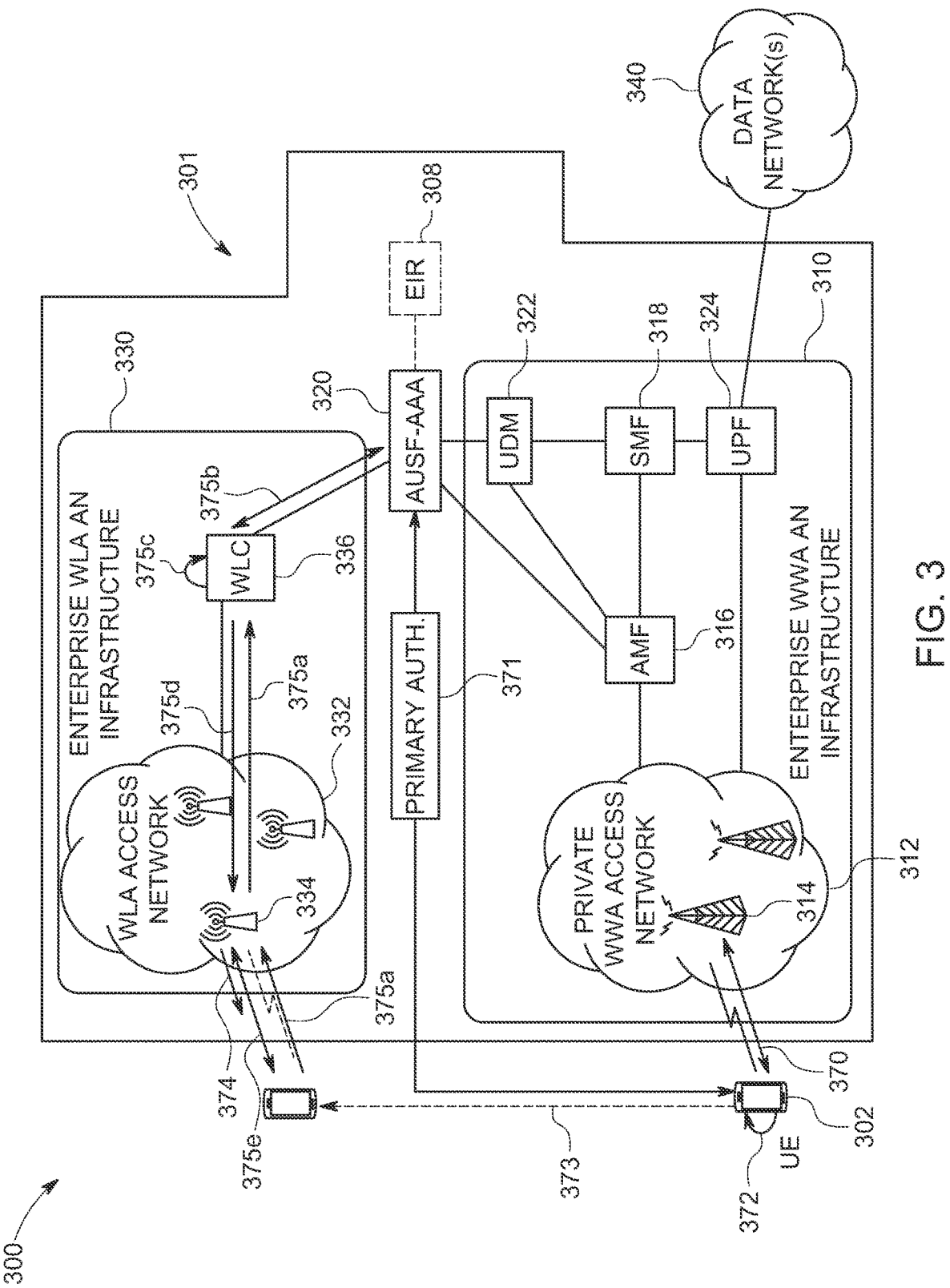
FIG. 3 is a diagram of another system in which techniques may be implemented to generate WLA access network FT key material based on authentication to a private WWA access network, according to an example embodiment.

Referring to FIG. 3, FIG. 3 is a diagram of another system 300 in which techniques may be implemented to generate WLA access network FT key material based on authentication to a private WWA access network, according to an example embodiment. In particular, system 300 illustrates features associated with a second technique in which a primary authentication process may be utilized to generate FT key material for a UE based on authentication of the UE to an enterprise (private) WWA access network in which the FT key material may facilitate FT authentication for connection of the UE to an enterprise WLA access network.

System 300 includes a UE 302, an AUSF and/or AAA (AUSF/AAA) server 320, an enterprise (private) WWA access network (AN) infrastructure 310, and an enterprise WLA AN infrastructure 330. One or more external data network(s) 340 are also shown in FIG. 3. Although not illustrated in FIG. 3, system 300 may also include an enterprise data network. In some embodiments, system 300 may further include an EIR 308, which may interface with the AUSF/AAA server 320.

The enterprise WWA AN infrastructure 310 may include an enterprise (private) WWA AN 312, an AMF 316, an SMF 318, a UDM 322, and at least one UPF 324. In some embodiments, AUSF/AAA server 320 and EIR 308 (if implemented) may be considered part of the WWA AN infrastructure 310. The private WWA AN 312 may include any number of WWA access nodes 314. The enterprise WLA AN infrastructure 330 may include a WLA AN 332 and a WLC 336. The WLA AN 342 may include any number of WLA access nodes (APs) 334. In one instance, the AUSF/ AAA server 320, EIR 308 (if implemented), the enterprise WWA AN infrastructure 310, and the WLA AN infrastructure 330 may collectively represent an enterprise network or domain 301, which may provide services to one or more enterprise devices, such as UE 302.

Generally, entities of system 300 may be configured/ operate and interface in a similar manner as discussed for system 100 of FIG. 1 except that system 300 may not include a DN-AAA server for secondary authentication processes and the AUSF/AAA server 320 may interface with WLC 336.

To illustrate various features of system 300 that may be utilized to provide for the ability to generate WLA access network 802.11r FT key material based on authentication to the private WWA access network 312 (e.g., utilizing a primary authentication process), consider various example operations 370, 371, 372, 373, 374, and 375 (375*a*, 375*b*, 375*c*, 375*d*, and 375*e*) discussed herein below. For the operations discussed for system 300, consider that UDM 322 is configured with a subscription profile for an enterprise user associated with UE 102 that among other subscription information for UE 102 may optionally include an indication that UE 102 is 11r FT capable.

For example, at 370, consider that UE 302 seeks to attach/connect to the private WWA access network 312 via WWA access node 314. For the attachment, UE 302 provides an indication to the private WWA access that it supports the 802.11r FT capability. In various embodiments, the 11r FT capability may be provided in an IE, one or more bit(s), byte(s), string(s), flag(s), and/or the like within a message communicated to the enterprise WWA AN infrastructure 310. For example, in one embodiment, the UE may provide the indication that it supports the 11r FT capability by setting a bit in a 5GS Update IE in a Registration Request. Alternatively, in one embodiment, the 11r FT capability could be indicated in an EAP attribute by the UE 302 to the WWA AN infrastructure 310 during via an EAP Identity-Response message.

For attachment/connection of UE 302 to the private WWA access network 312 for the embodiment of FIG. 3, a primary authentication process 371 is performed for the UE 302 via AUSF/AAA server 320. The AUSF/AAA server 320 may obtain the indication that the UE 102 is 11r FT capable either from the UE 302 via a Registration Request, etc. from the UE 302 or from subscription information stored for UE 302 in the UDM 322. During the primary authentication process 371, the AUSF/AAA server 320 and the UE 302 each generate a MSK through SIM-based or non-SIM-based authentication procedures (e.g., EAP-TLS, EAP-TTLS, EAP-AKA/EAP-AKA', etc.).

Upon successful completion of the primary authentication process 371, the 3GPP WWA access network infrastructure 310 via AUSF/AAA server 320 provides to the UE 302 a network identifier for the WLA access network 342, such as a Service Set Identifier (SSID) (e.g., 'enterpriseWLA'). The AUSF/AAA server 320 also provides a pseudo-NAI for the UE 302 and an AUSF/AAA identifier (AAA-ID) for AUSF/ AAA server 320. The SSID, pseudo-NAI, and AAA-ID may be provided to the UE via various signaling such as RRC signaling, NAS signaling, or an EAP-SUCCESS.

As shown at 372, the UE 302 can derive and store the FT hierarchical keys for the target SSID for the WLA access network 332, which may include deriving the first level FT key, PMK-R0, from the MSK root security key and deriving the second level FT key PMK-R1 from the PMK-R0. At 373, consider that UE 302 moves from the private WWA access network 312 nearer to the WLA access network 332, in particular, to within connection range to the WLA access node 334.

As shown at 374, WLA access nodes 334 may provide (transmit) an indication that the WLA access network 332 supports the 802.11r Fast Transition (FT) capability. In various embodiments, the indication can be provided by the WLA access nodes 334 (APs) in a MDIE (MDIE) (e.g., a 'Fast Transition from 3GPP' bit set in the MDIE) via a broadcast beacon and/or via a probe response.

At 375*a*, upon determining that the WLA access network 332 supports the 11r FT capability, UE 302 initiates authentication and association to the WLA access network 332/ WLA access node 334 for the first time using an 802.11 FT Authentication-Request (instead of a typical 802.11 Association message) with a new 'Fast Transition from 3GPP' bit set in a MDIE for the 802.11 FT Authentication-Request. The FT Authentication-Request also includes an FT key index that is provided to the WLA access node 332 as well as the pseudo-NAI for UE 302 and the AAA-ID for AUSF/AAA server 320.

Using the AAA-ID, WLC 336 identifies and queries AUSF/AAA server 320, as shown at 375b, using the pseudo-NAI for UE 102 in order to obtain the MSK from AUSF/AAA server 320 for UE 302. At 375c, WLC 336 derives/generates the first level FT key, PMK-R0, from the MSK and the second level FT key, PMK-R1, from the first level FT key. At 375d, WLC 336 transmits the PMK-R1 to the WLA access node 334 and, at 375e, UE 102 association to the WLA access network 132 completes using the 11r FT authentication and association in which the UE 302 completes a FT 4-way handshake with the WLA access node 334 to develop the PTKSA for the WLA access node 334.

Accordingly, the techniques illustrated for FIG. 3 may also reduce authentication time to the WLA access network 332 to milliseconds and the user associated with UE 302 is unlikely to experience an interruption of service for ultra-latency sensitive applications as the user moves from a 3GPP access (e.g., 5G/nG) using secondary authentication to a WLA access (e.g., Wi-Fi/Wi-Fi6).

Referring to FIGS. 4A, 4B, 4C, 4D, and 4E, FIGS. 4A, 4B, 4C, 4D, and 4E are a message sequence diagram illustrating a call flow 400 associated with generating WLA access network FT key material based on authentication to a private WWA access network utilizing the system of FIG. 3, according to an example embodiment. FIGS. 4A-4E include UE 302, AMF 316, AUSF/AAA server 320, UDM 322, WLA access node 334, and WLC 336.

For the embodiment of FIGS. 4A-4E, consider that UDM 322 is configured with a subscription profile for an enterprise user associated with UE 102 that among other subscription information for UE 102 may optionally include an indication that UE 102 is 11r FT capable.

At 402, consider that a RRC connection is established for UE 302 and, at 404, UE 302 communicates a Registration Request to AMF 316 (via WWA access node 314) in which the Registration Request can optionally include an indication that the UE 302 supports an 802.11r Fast Transition capability. At 406, AMF 316 obtains subscription information for UE 302 from UDM 322, which may, in some embodiments, include obtaining an indication that UE 302 is 11r capable. The indication that the UE 302 is 11r FT capable is provide to AUSF/AAA server 320 to facilitate MSK generation in accordance with embodiments herein.

Figure 4A:
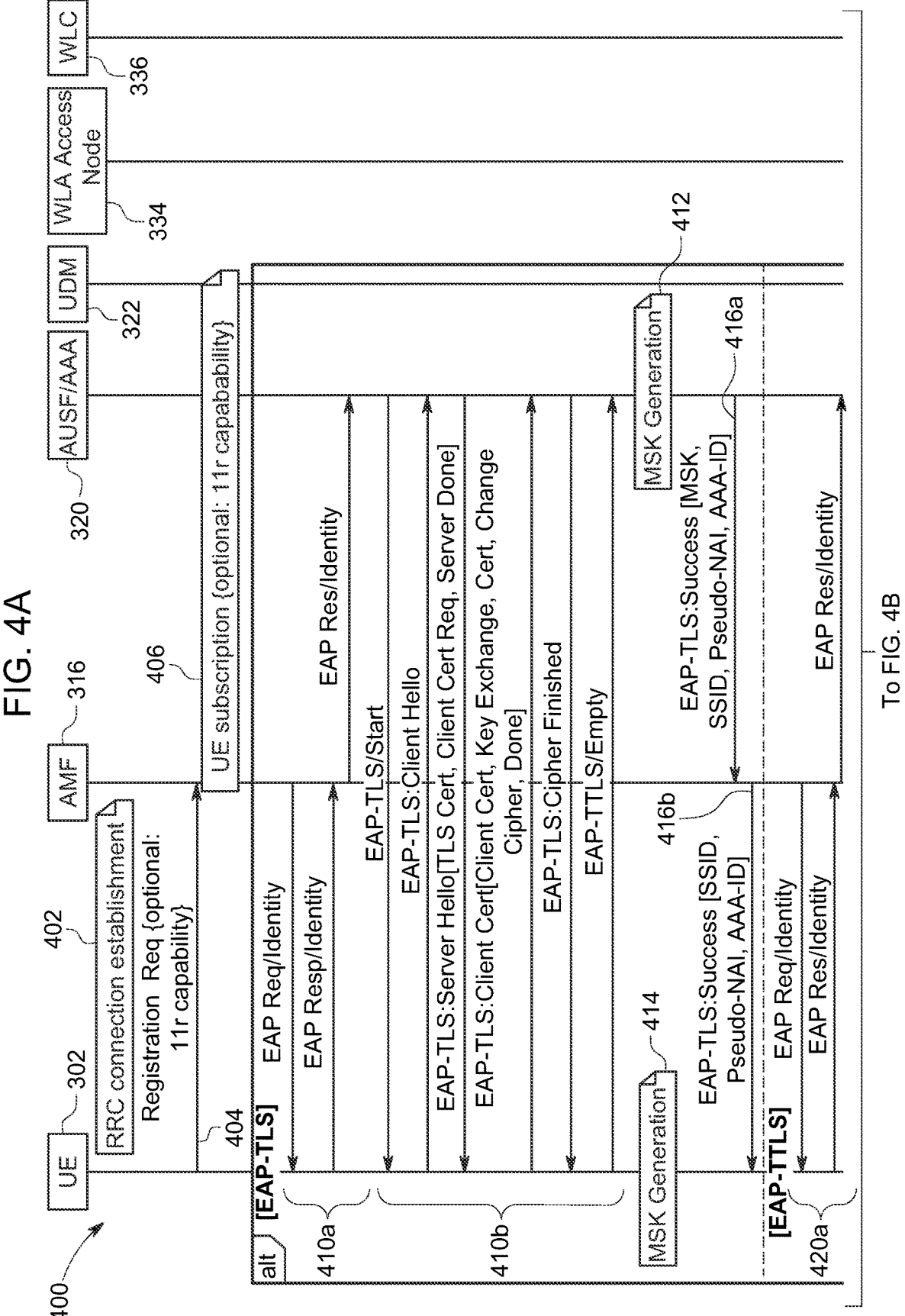

Various types of SIM-based or non-SIM-based primary authentication processes can be performed for authenticating UE 302 to the private WWA access in accordance with embodiments herein, including, but not limited to EAP-TLS, EAP-TTLS, EAP-AKA/EAP-AKA', or 5G-AKA which are discussed with reference to various optional operations as shown in FIG. 4A. Based on determining that the UE 302 supports the 11r FT capability, the primary authentication process can include generating an MSK by AUSF/AAA 320 and by UE 302, which, through generation of FT hierarchical keys, can facilitate UE 302 connection to the WLA access network 332.

For an EAP-TLS authentication, for example, an EAP Identity Request/Response exchange 410a may be performed between UE 302 and AMF 316 in which UE 302 provides an identity (e.g., 'Id@enterprise.com') via an EAP-Response/Identity to AMF 316, which forwards the response to AUSF/AAA 320. At 410b, an EAP-TLS exchange process can be performed between UE 302 and AUSF/AAA server

320 in which the EAP-TLS exchange process 410b may be performed as prescribed at least by IETF RFC 5281. Following EAP-TLS exchange process 410b, the AUSF/AAA server 320 performs MSK generation, as shown at 412, to generate an MSK (e.g., root security key) for the UE 302 for connection to the WLA access network 332 and UE 102 also performs MSK generation, as shown at 414, to generate the MSK for the UE 302 connection to the WLA access network 332. Following MSK generation, as shown at 416a, AUSF/AAA server 320, communicates an EAP-TLS Success message to AMF 316 that includes the MSK, the SSID for the WLA access network 332 (e.g., 'enterpriseWLA'), a pseudo-NAI for the UE 302, and an identifier for the AUSF/AAA server 320 (AAA-ID), and the AMF 316 forwards the message to UE 302, as shown at 416b, including the SSID, the pseudo-NAI, and the AAA-ID. The UE 302 may store/maintain an association between the MSK that it has generated and the SSID for the WLA access network, the pseudo-NAI, and the AAA-ID in order to perform an 11r FT authentication to the WLA access network 432, as discussed below.

In another example for an EAP-TTLS authentication, an EAP Identity Request/Response exchange 420a may be performed between UE 302 and AMF 316 in which UE 302 provides an identity via an EAP-Response/Identity to AMF 316, which forwards the response to AUSF/AAA 320. Continuing to FIG. 4B, a Phase 1 EAP-TTLS exchange process 420b and a Phase 2 EAP-TTLS exchange process 420c can be performed between the UE 302 and the AUSF/AAA server 320 as prescribed at least by IETF RFC 5281. For the Phase 1 EAP-TTLS exchange process 420b, MSK generation can be performed by the AUSF/AAA server 320 at 422 and the UE 302 at 424. Following completion of the Phase 1 EAP-TTLS exchange process 420b, the Phase 2 EAP-TTLS exchange process 420b is performed, which results in AUSF/AAA server 320, communicating an EAP-TTLS Success message to AMF 316, as shown at 426a, that includes the MSK, the SSID for the WLA access network 332, a pseudo-NAI for the UE 302, and an identifier for the AUSF/AAA server 320 (AAA-ID), and the AMF 316 forwards the message to UE 302, as shown at 426b, including the SSID, the pseudo-NAI, and the AAA-ID. The UE 302 may store/maintain an association between the MSK that it has generated and the SSID for the WLA access network 332, the pseudo-NAI, and the AAA-ID in order to perform an 11r FT authentication to the WLA access network 332, as discussed below.

In yet another example for an EAP-AKA/EAP-AKA' authentication, an EAP Identity Request/Response exchange 430a may be performed between UE 302 and AMF 316 in which UE 302 provides an identity via an EAP-Response/Identity to AMF 316, which forwards the response to AUSF/AAA 320. Continuing to FIG. 4C, an initial EAP-AKA/EAP-AKA' exchange process 430b can be performed between UE 302 and AUSF/AAA server 320 as prescribed at least by IETF RFC 3748/4187/5448. MSK generation can then be performed by the AUSF/AAA server 320 at 432 and the UE 302 at 434. Following the MSK generation, as shown at 436a, AUSF/AAA server 320, communicates an EAP-Success message to AMF 316 that includes the MSK, the SSID for the WLA access network 332, a pseudo-NAI for the UE 302, and an identifier for the AUSF/AAA server 320 (AAA-ID), and the AMF 316 forwards the message to UE 302, as shown at 436b, including the SSID, the pseudo-NAI, and the AAA-ID. The UE 302 may store/maintain an association between the MSK that it has generated and the SSID for the WLA access network 332, the pseudo-NAI, and the AAA-ID in order to perform 11r FT authentication to the WLA access network 432, as discussed below.

In yet another example for a 5G-AKA authentication, a 5G-AKA exchange process 440 is performed between UE 302, AMF 316, and AUSF/AAA server 320, as prescribed at least by 3GPP Technical Specification (TS) 33.501, which results in generation of a 5G root security key, Kamf. A UE Authentication response from AUSF/AAA 320, at 442, is communicated to AMF 316 indicating successful authentication for UE 302 that includes the SSID, the pseudo-NAI for UE 302, and the AAA-ID for AUSF/AAA server 320. Obtaining the indication of successful authentication triggers AMF to perform NAS security mode procedures with UE 302, as shown at 444. At 446, AUSF/AAA server 320 performs MSK generation from the 5G Kamf and, at 448, UE 302 performs MSK generation from the 5G Kamf.

Thus, various authentication exchanges may be performed in order to complete a primary authentication process and attachment for the UE to the private WWA access network 312, as shown at 450, in accordance with embodiments herein.

Figure 4D:
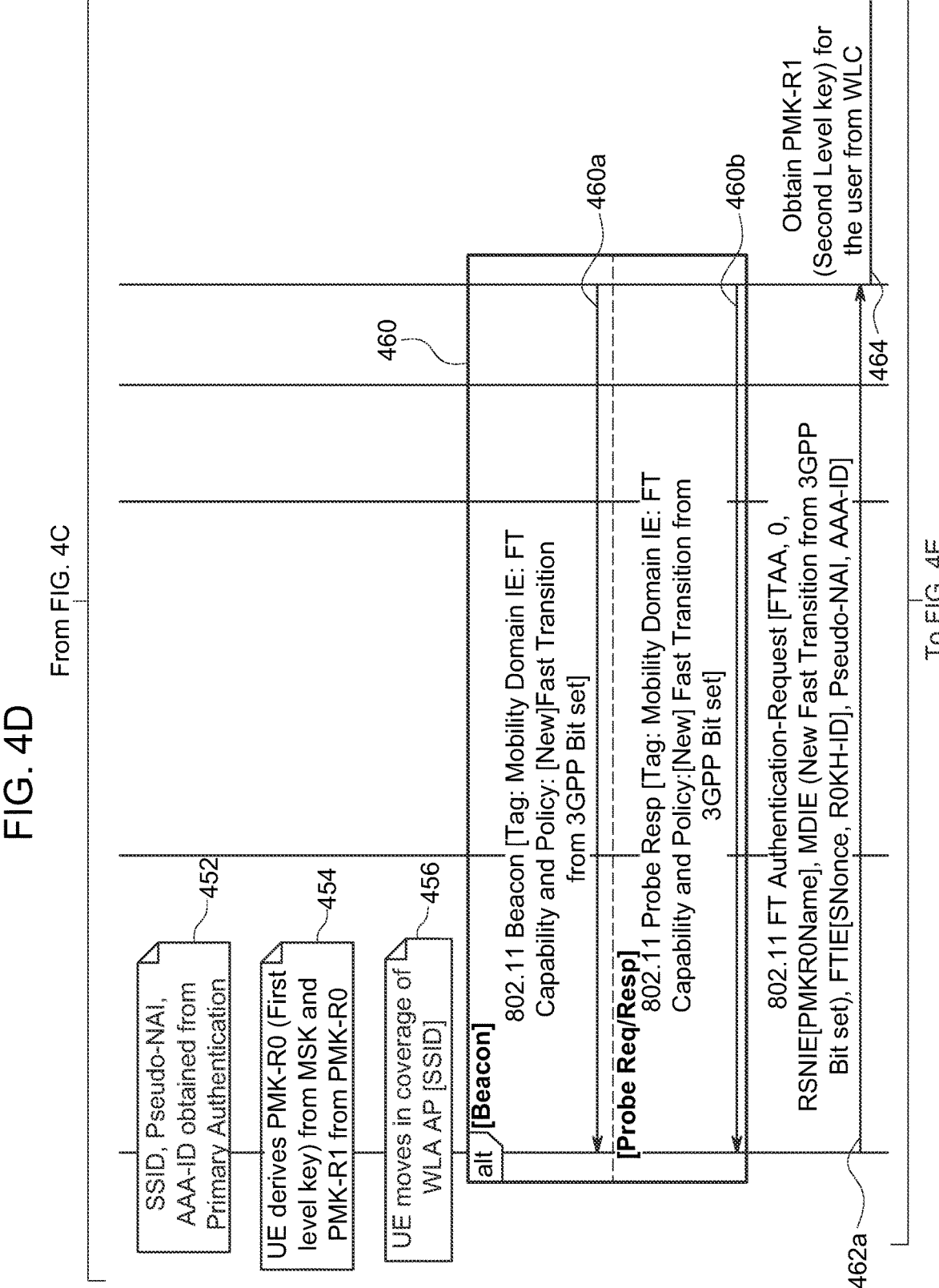

Continuing to FIG. 4D, as shown at 452, UE 302 stores/maintains an association between the MSK that was generated for the primary authentication process and the SSID for the WLA access network 332, the pseudo-NAI, and the AAA-ID for AUSF/AAA server 320. At 454, UE 302 derives/generates the first level FT key, PMK-R0, from the MSK and the second level FT key PMK-R1 from the PMK-R0.

Consider at 456 that the UE 302 moves into the coverage of the WLA access node 334, which broadcasts the SSID for the WLA access network 332 (e.g., 'enterpriseWLA'). At 460, consider that the WLA access network 332, via WLA access node 334, provides an indication that the WLA access network 142 supports the 11r FT capability. For example, in at least one embodiment as shown at 460a, the WLA access node 134 may broadcast an 802.11 Beacon that includes an FT capability and policy tag within the MDIE with a bit set that indicates that the WLA access network 332 supports Fast Transition from a 3GPP (e.g., WWA) access. In another example, in at least one embodiment as shown at 460b, the WLA access node 134 may transmit an 802.11 Probe Response that includes an FT capability and policy tag within the MDIE with a bit set that indicates that the WLA access network 332 supports Fast Transition from a 3GPP (e.g., WWA) access.

Obtaining the indication by the UE 302 that the WLA access network supports the 11r FT capability may trigger the UE 302 to initiate, at 462a, an FT 4-way handshake with WLA access node 434 to derive encryption keys for communication establishment for UE 302 to the WLA access network 332. For example, at 462a, the UE 302 initiates an 802.11 FT Authentication-Request that includes, among other information, an MDIE including the Fast Transition from 3GPP bit set, the pseudo-NAI for UE 302, and the AAA-ID for AUSF/AAA server 320, which may trigger WLA access node 334 to query WLC 336 in order to obtain the PMK-R1 for UE 302, as shown at 464, in which the query includes the AAA-ID for AUSF/AAA server 320 and the pseudo-NAI for UE 302.

Figure 4E:
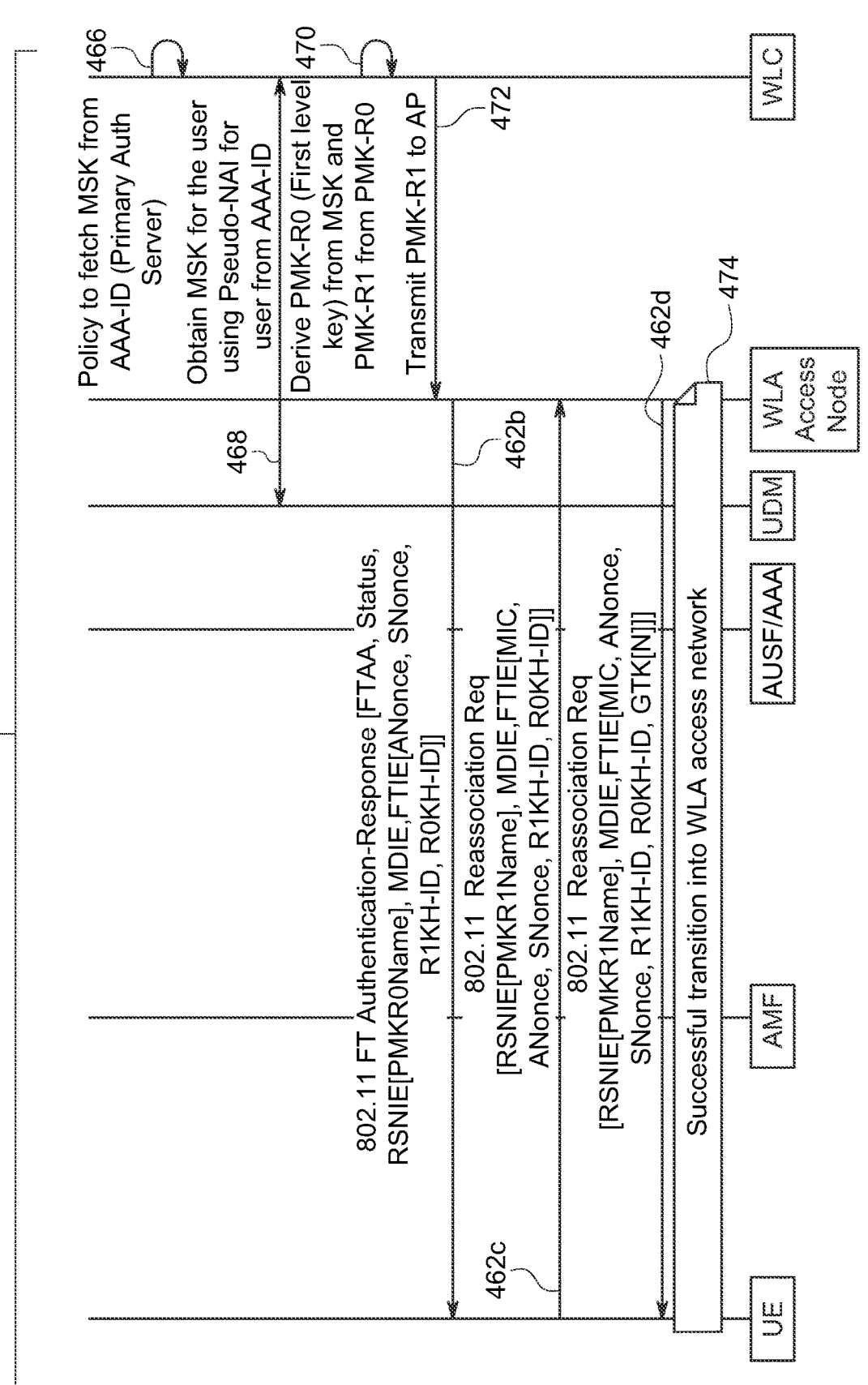

Continuing to FIG. 4E, at 466, WLC 336 determines, based on a local policy configured by the enterprise entity that it is to fetch the MSK for UE 302 from the primary authentication server, AUSF/AAA server 320, as identified by the AAA-ID. Based on the policy and the AAA-ID, at 468, WLC 336 identifies and queries AUSF/AAA server 320 to obtain the MSK for UE 302 using the pseudo-NAI for UE 302. As shown at 470, WLC 336 derives/generates the first level FT key, PMK-R0, from the MSK and the second level FT key, PMK-R1, from the PMK-R0.

At 472, WLC 336 transmits the PMK-R1 to the WLA access node 334, which triggers the WLA access node 334 to complete the FT 4-way handshake with UE 302, as shown at 462b, 462c, and 462d, in order to derive encryption keys for communication establishment for UE 302 to the WLA access network 332. Successful completion of the FT 4-way handshake with UE 302 results in successful transition of the UE to the WLA access network 332, as shown at 474.

Accordingly, the techniques illustrated in FIGS. 3, 4A-4E may provide for the ability to utilize 3GPP-generated Session Keys (e.g., root security keys such as MSKs) that are generated during a primary authentication process for a UE via a private WWA access network in which the keys can be leveraged to facilitate connection of the UE to a WLA access network.

Referring to FIG. 5, FIG. 5 is a flow chart depicting a method 500 according to an example embodiment. In at least one embodiment, method 500 illustrates example operations that may be performed, at least in part, by an authentication server, such as DN-AAA 106 or AUSF/AAA 320 in order to facilitate the generation of Session Keys (e.g., root security keys such as MSKs) during an authentication process for a private WWA access network (e.g., private WWA access network 112/312) such that the keys can be leveraged to facilitate connection of the UE to a WLA access network (e.g., WLA access network 132/332).

For example, at 502, the method may include obtaining, by the authentication server, a request to authenticate a UE for connection to a WWA access network of an enterprise. At 504, the method may include determining, by the authentication server, that the UE is capable of connecting to a WLA access network of the enterprise utilizing a Fast Transition capability (e.g., 802.11r FT capability).

At 506, the method may include authenticating the UE for connection to the WWA access network of the enterprise in which, based determining that the UE is capable of connecting to the WLA access network of the enterprise utilizing the fast transition capability, the authenticating includes generating a root security key (e.g., an MSK) for the UE for connection to the WLA access network of the enterprise.

In one embodiment, the authenticating may be a secondary authentication process performed for the UE that is subsequent to a primary authentication process for the UE in which the primary authentication process enables the UE to connect to the WWA access network of the enterprise. In such an embodiment, the secondary authentication process may be an EAP-based authentication process.

In one embodiment, the authenticating may be a primary authentication process performed for the UE in which the primary authentication process enables the UE to connect to the WWA access network of the enterprise.

In one embodiment, the authenticating may include a primary authentication process in which the primary authentication process includes a SIM-based authentication process or a non-SIM-based authentication process.

At 508, the method may include, upon determining that the UE is attempting to access the WLA access network of the enterprise, providing, by the authentication server, the root security key for the UE to the WLA access network to facilitate authentication/connection of the UE to the WLA access network. In one embodiment, the method may include providing the root security key, such as an MSK, to a WLC (e.g., WLC 136/336) in which the WLC may generate FT hierarchical key PMK-R0 from the MSK and the PMK-R1 from the PMK-R0 to facilitate authentication/ connection of the UE to the WLA access network.

Figure 6:
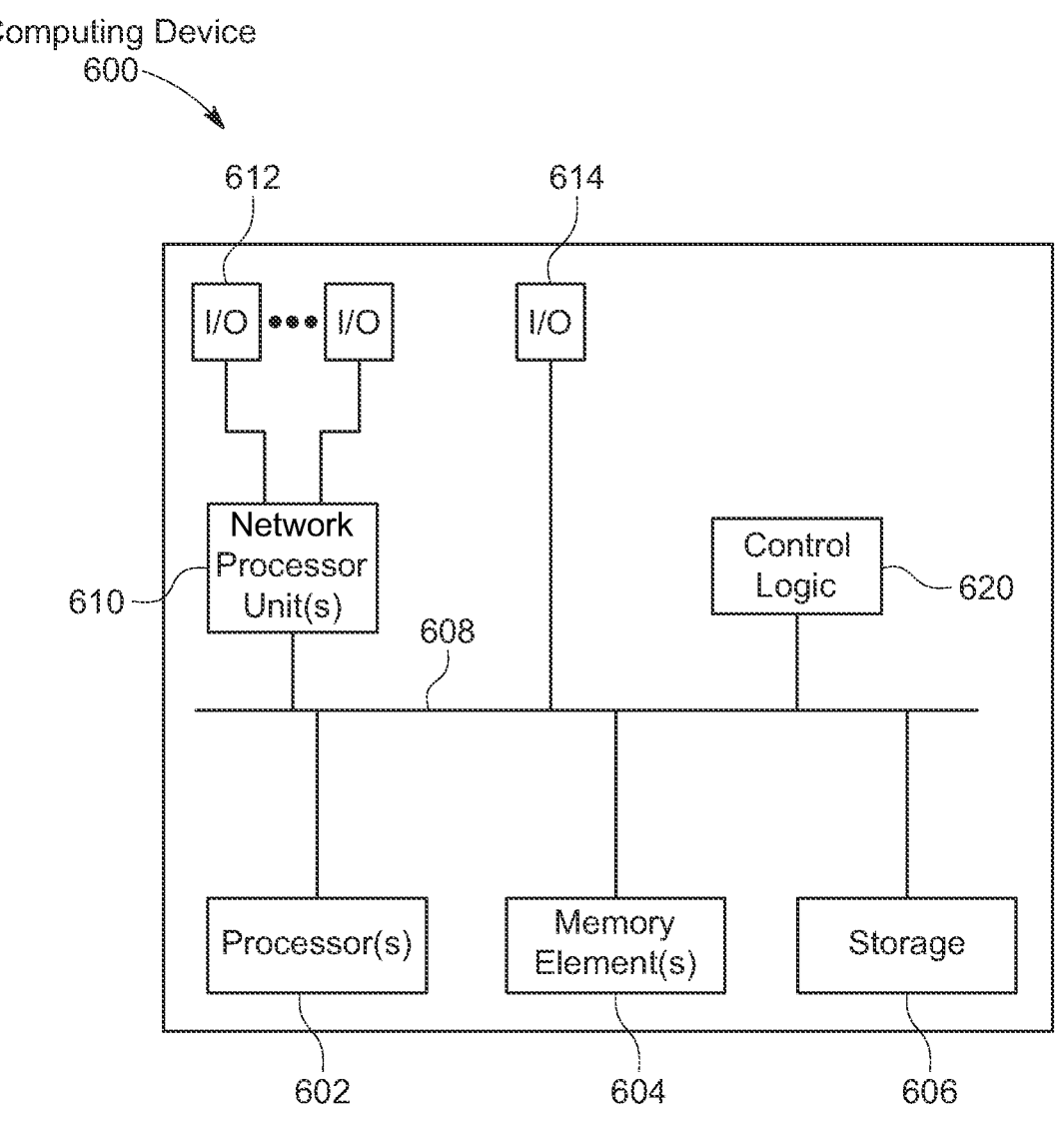
FIG. 6 is a hardware block diagram of a computing device that may perform functions associated with any combination of operations, in connection with the techniques depicted in FIGS. 1-5.

Referring to FIG. 6, FIG. 6 illustrates a hardware block diagram of a computing device 600 that may perform functions associated with operations discussed herein in connection with the techniques depicted in FIGS. 1-5. In various embodiments, a computing device, such as computing device 600 or any combination of computing devices 600, may be configured as any entity/entities as discussed for the techniques depicted in connection with FIGS. 1-5 in order to perform operations of the various techniques discussed herein.

In at least one embodiment, computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device. Processor(s) 602 (e.g., hardware processor(s)) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computer device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that includes obtaining a request to authenticate a user equipment (UE) for connection to a wireless wide area access network of an enterprise; determining that the UE is capable of connecting to a wireless local area access network of the enterprise utilizing a fast transition capability; authenticating the UE for connection to the wireless wide area access network of the enterprise, wherein based on determining that the UE is capable of connecting to the wireless local area access network of the enterprise utilizing the fast transition capability, the authenticating includes generating a root security key for the UE for connection to the wireless local area access network of the enterprise; and upon determining that the UE is attempting to access the wireless local area access network of the enterprise, providing the root security key for the UE to the wireless local area access network to facilitate connection of the UE to the wireless local area access network.

In one instance, the authenticating may be a secondary authentication process performed for the UE that is subsequent to a primary authentication process for the UE in which the primary authentication process enables the UE to connect to the wireless wide area access network of the enterprise. In one instance, the secondary authentication process may be an Extensible Authentication Protocol (EAP) authentication process.

In one instance, the authenticating may be a primary authentication process performed for the UE in which the primary authentication process enables the UE to connect to the wireless wide area access network of the enterprise.

In one instance, when the authenticating includes a primary authentication process, the primary authentication process includes a Subscriber Identity Module (SIM) based authentication process or a non-SIM-based authentication process.

In one instance, the authenticating may include providing a Service Set Identifier (SSID) for the wireless local area access network of the enterprise to the UE via the wireless wide area access network of the enterprise.

The root security key is a Master Session Key (MSK). In one instance, the method may further include deriving, by the wireless wide area access network, a first level fast transition key (PMK-R0) from the MSK; and deriving a second level fast transition key from the first level transition key (PMK-R1), wherein the second level fast transition key is utilized to complete a 4-way fast transition handshake between the UE and a wireless local area access network access node to establish the connection between the UE and the wireless local area access network.

In one instance, determining that the UE is capable of connecting to the wireless local area access network of the enterprise utilizing the fast transition capability includes obtaining an indication from the UE that the UE is capable of the fast transition capability. In one instance, determining that the UE is capable of connecting to the wireless local area access network of the enterprise utilizing the fast transition capability includes obtaining subscription information indicating that the UE is capable of the fast transition capability.

In one instance, the method may further include providing, by the wireless local area access network, an indication to the UE that the wireless local area access network supports the fast transition capability. In one instance, the indication is provided via at least one of a broadcast by at least one wireless local area access network node and a probe response transmitted by at least one wireless local area access network node.

In summary, techniques herein provide for the ability to utilize 3GPP-generated Session Keys (e.g., root security keys such as MSKs) that can be generated via a primary authentication process or a secondary authentication process for a UE via a private WWA access network of an enterprise entity in which the keys can be leveraged to facilitate connection of the UE to a WLA access network of the enterprise entity.

The current 3GPP to Wi-Fi transition process typically results in upwards of 8-10s seconds to perform 802.11 association, 802.1x procedure and 4-way handshake when user enters a Wi-Fi access from a 3GPP access. However, for techniques provided herein, it is estimated the handover latency for LTE/5G access and Wi-Fi access roaming may be reduced to between 50 milliseconds (msec) and 100 msec (e.g., based on time stamps collected during example implementations); thus, potentially a 90% improvement over current processes, which may greatly improve user experience.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
receiving from a user equipment (UE) a request for connection to a wireless wide area access network;
authenticating, by an authentication server of the wireless wide area access network, the UE for connection to the wireless wide area access network, wherein the authenticating includes generating a root security key for the UE to enable connection to the wireless wide area access network;
upon successfully authenticating the UE to the wireless wide area access network, providing to the UE, via the wireless wide area network, a network access identifier that identifies the UE; and
providing the root security key and the network access identifier that identifies the UE to a wireless local area access network to facilitate establishment of an encrypted connection of the UE to the wireless local area access network, wherein the root security key is used to derive a pairwise master key used in a four-way handshake between the UE and the wireless local area access network to establish the encrypted connection.

2. The method of claim 1, wherein the wireless wide area access network is a cellular network.

3. The method of claim 2, wherein the cellular network comprises a Citizens Broadband Radio Service (CBRS) access network.

4. The method of claim 1, wherein the wireless wide area access network is a Third Generation Partnership Project (3GPP) cellular network.

5. The method of claim 1, wherein the wireless local area access network is an IEEE 802.11 network.

6. The method of claim 1, further comprising:
upon successfully authenticating the UE to the wireless wide area access network, providing to the UE, via the wireless wide area network, an identifier of an authentication node involved in the authentication for the UE.

7. The method of claim 1, further comprising:
upon successfully authenticating the UE to the wireless wide area access network, providing to the UE, via the wireless wide area network, a Service Set Identifier (SSID) that identifies the wireless local area access network.

8. The method of claim 1, further comprising:
upon successfully authenticating the UE to the wireless wide area access network, providing to the UE, via the wireless wide area network, an identifier of an authentication node involved in the authentication for the UE, and a Service Set Identifier (SSID) that identifies the wireless local area access network.

9. The method of claim 1, wherein the providing the root security key to the wireless local area network is triggered by the UE attempting to access the wireless local area access network.

10. The method of claim 1, wherein the authenticating is a secondary authentication process performed for the UE that is subsequent to a primary authentication process for the UE in which the primary authentication process enables the UE to connect to the wireless wide area access network.

11. The method of claim 10, wherein the secondary authentication process is an Extensible Authentication Protocol (EAP) authentication process.

12. The method of claim 1, wherein the authenticating is a primary authentication process performed for the UE in which the primary authentication process enables the UE to connect to the wireless wide area access network.

13. The method of claim 1, wherein the root security key is a Master Session Key (MSK).

14. The method of claim 1, further comprising:
providing, by the wireless local area access network, an indication to the UE that the wireless local area access network supports a fast transition capability.

15. A system comprising:
at least one memory element for storing data; and
at least one processor for executing instructions associated with the data, wherein executing the instructions causes the system to perform operations, comprising:
receiving from a user equipment (UE) a request for connection to a wireless wide area access network;
authenticating, by an authentication server of the wireless wide area access network, the UE for connection to the wireless wide area access network, wherein the authenticating includes generating a root security key for the UE to enable connection to the wireless wide area access network;
upon successfully authenticating the UE to the wireless wide area access network, providing to the UE, via the wireless wide area network, a network access identifier that identifies the UE; and
providing the root security key and the network access identifier that identifies the UE to a wireless local area access network to facilitate establishment of an encrypted connection of the UE to the wireless local area access network, wherein the root security key is used to derive a pairwise master key used in a four-way handshake between the UE and the wireless local area access network to establish the encrypted connection.

16. The system of claim 15, wherein the wireless wide area access network is a cellular network.

17. The system of claim 16, wherein the cellular network comprises a Citizens Broadband Radio Service (CBRS) access network.

18. The system of claim 15, wherein the wireless wide area access network is a Third Generation Partnership Project (3GPP) cellular network.

19. The system of claim 15, wherein the wireless local area access network is an IEEE 802.11 network.

20. The system of claim 15 wherein executing the instructions causes the system to perform further operations, comprising:
upon successfully authenticating the UE to the wireless wide area access network, providing to the UE, via the wireless wide area network, an identifier of an authentication node involved in the authentication for the UE.

21. The system of claim 15, wherein executing the instructions causes the system to perform further operations, comprising:
upon successfully authenticating the UE to the wireless wide area access network, providing to the UE, via the wireless wide area network, a Service Set Identifier (SSID) that identifies the wireless local area access network.

22. The system of claim 15, wherein executing the instructions causes the system to perform further operations, comprising:
upon successfully authenticating the UE to the wireless wide area access network, providing to the UE, via the wireless wide area network, an identifier of an authentication node involved in the authentication for the UE, and a Service Set Identifier (SSID) that identifies the wireless local area access network.

23. The system of claim 15, wherein the providing the root security key to the wireless local area network is triggered by the UE attempting to access the wireless local area access network.

24. The system of claim 15, wherein the authenticating is a secondary authentication process performed for the UE that is subsequent to a primary authentication process for the UE in which the primary authentication process enables the UE to connect to the wireless wide area access network.

25. The system of claim 24, wherein the secondary authentication process is an Extensible Authentication Protocol (EAP) authentication process.

26. The system of claim 15, wherein the authenticating is a primary authentication process performed for the UE in which the primary authentication process enables the UE to connect to the wireless wide area access network.

27. The system of claim 15, wherein the root security key is a Master Session Key (MSK).

* * * * *